(12) United States Patent
Shigeta

(10) Patent No.: US 11,016,370 B2
(45) Date of Patent: May 25, 2021

(54) GRIPPING DEVICE AND ELECTRONIC APPARATUS WITH GRIPPING DEVICE

(71) Applicant: CANON KABUSHIKI KAISHA, Tokyo (JP)

(72) Inventor: Koichi Shigeta, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/583,433

(22) Filed: Sep. 26, 2019

(65) Prior Publication Data

US 2020/0103729 A1    Apr. 2, 2020

(30) Foreign Application Priority Data

Oct. 2, 2018  (JP) .............................. JP2018-187539

(51) Int. Cl.
*G03B 17/56* (2021.01)
*H04N 5/232* (2006.01)

(52) U.S. Cl.
CPC ......... *G03B 17/563* (2013.01); *G03B 17/561* (2013.01); *H04N 5/23216* (2013.01)

(58) Field of Classification Search
CPC ................ G03B 17/563; G03B 17/561; H04N 5/23216; H04N 5/232; H04N 5/2252; H04N 5/2254
See application file for complete search history.

(56) References Cited

U.S. PATENT DOCUMENTS

| 2007/0166027 | A1* | 7/2007 | Misawa | ............... H04N 5/2252 396/529 |
| 2007/0268371 | A1* | 11/2007 | Misawa | ............. H04N 5/23203 348/207.99 |
| 2009/0059397 | A1* | 3/2009 | Igarashi | ............... H04N 5/2251 359/818 |
| 2015/0331221 | A1* | 11/2015 | Koiwai | .................. G02B 7/102 359/701 |

FOREIGN PATENT DOCUMENTS

JP          2005181718 A       7/2005

* cited by examiner

*Primary Examiner* — Gevell V Selby
(74) *Attorney, Agent, or Firm* — Rossi, Kimms & McDowell LLP

(57) ABSTRACT

A gripping device that enables a user to operate operation members like switches favorably. The gripping device is attached to an electronic apparatus and is used for gripping the electronic apparatus. The gripping device includes a gripping member of which a side surface is approximately circular, and an operation member that has an operation panel arranged along a circumference of the gripping member and that is operated for causing a predetermined action of the electronic apparatus. The operation member allows at least a first operation that presses the operation panel in a radial direction of the gripping member and a second operation that slides the operation panel in a circumferential direction of the gripping member from a position moved by the first operation.

15 Claims, 25 Drawing Sheets

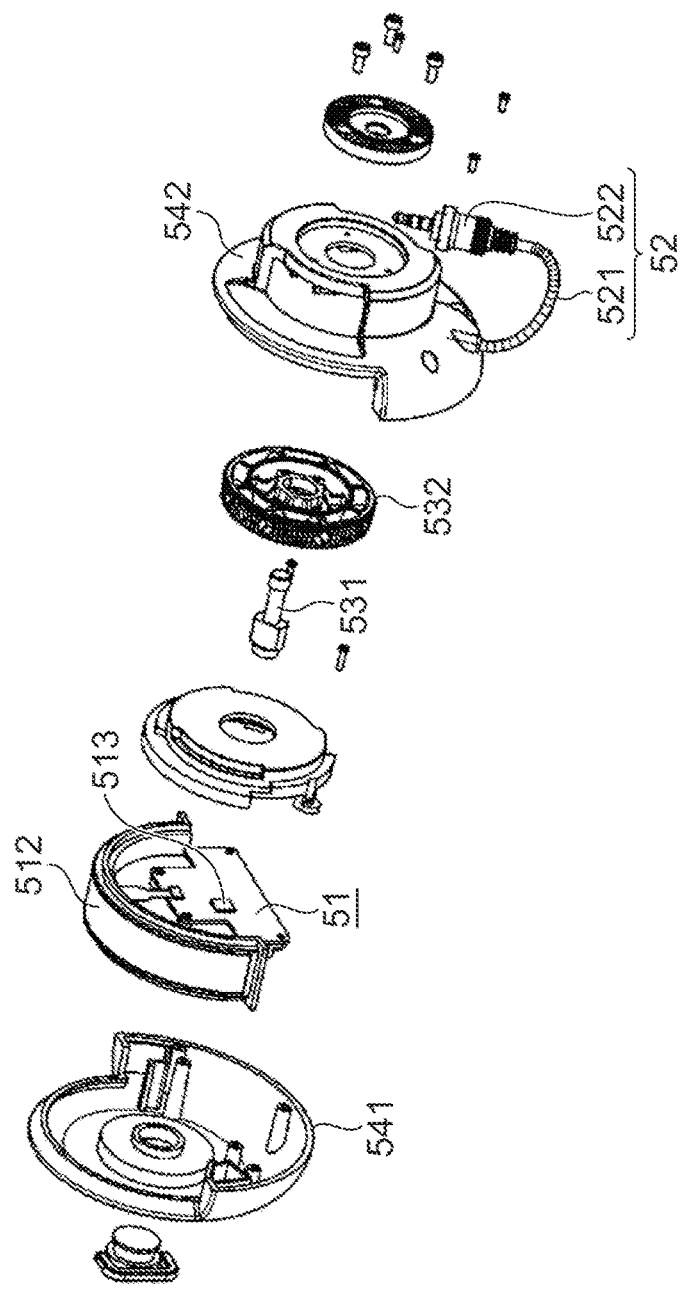
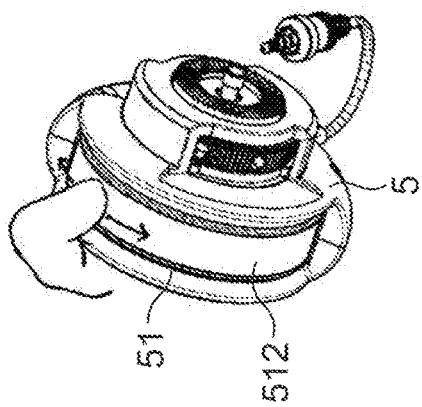
FIG. 19B
FIG. 19A

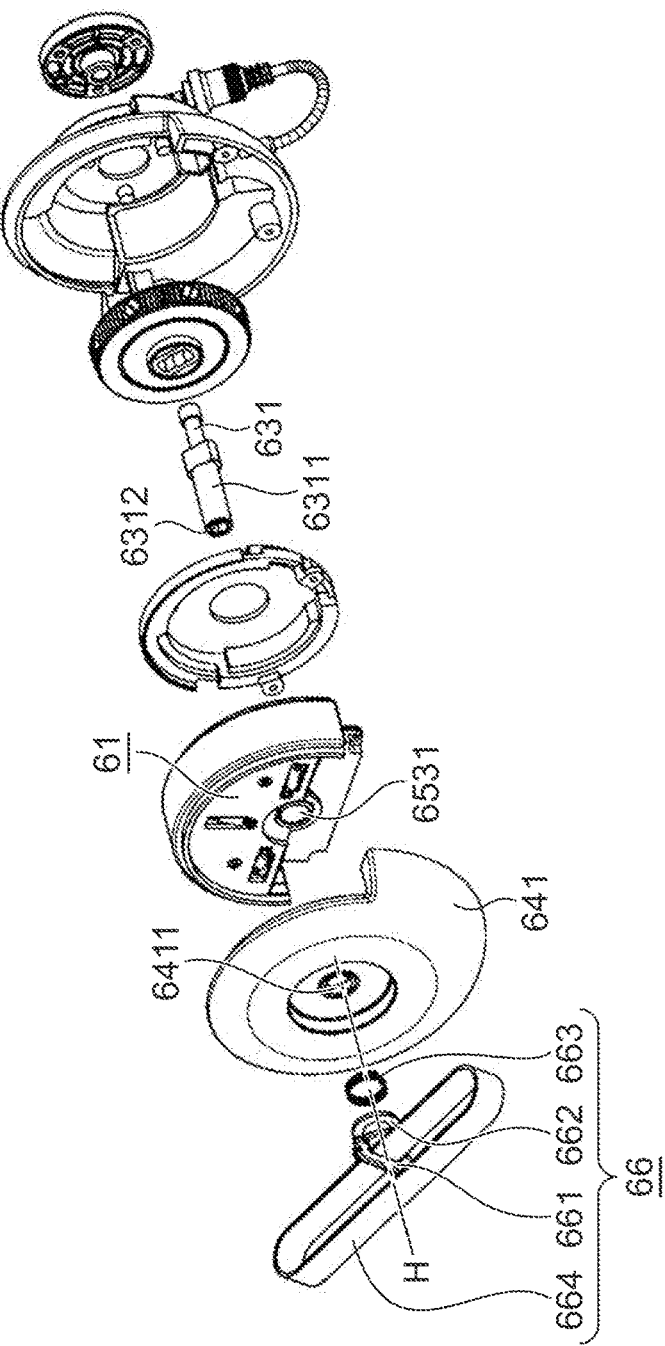
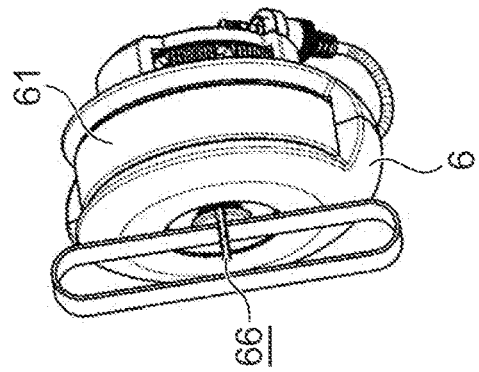
FIG. 20B
FIG. 20A

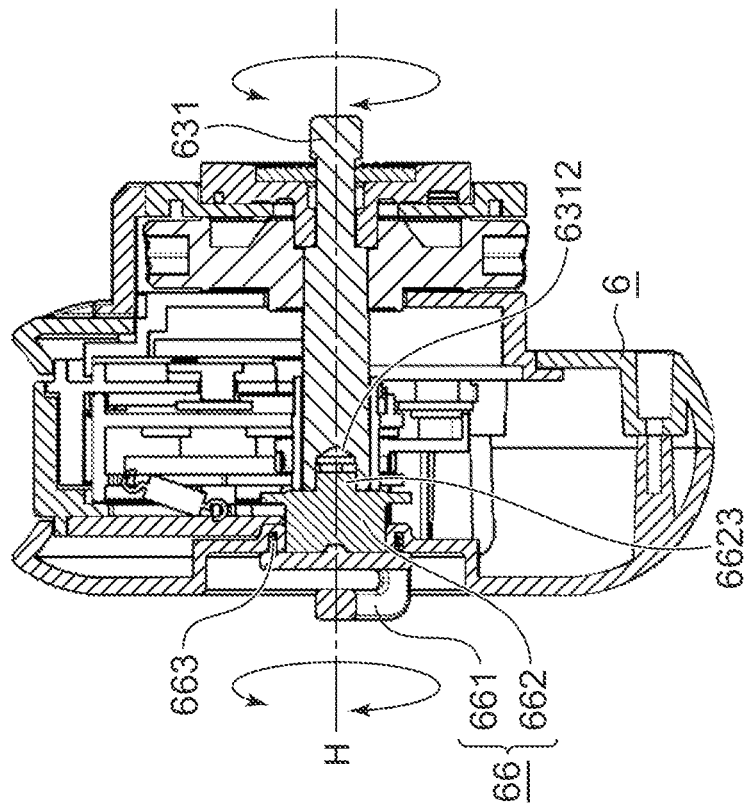
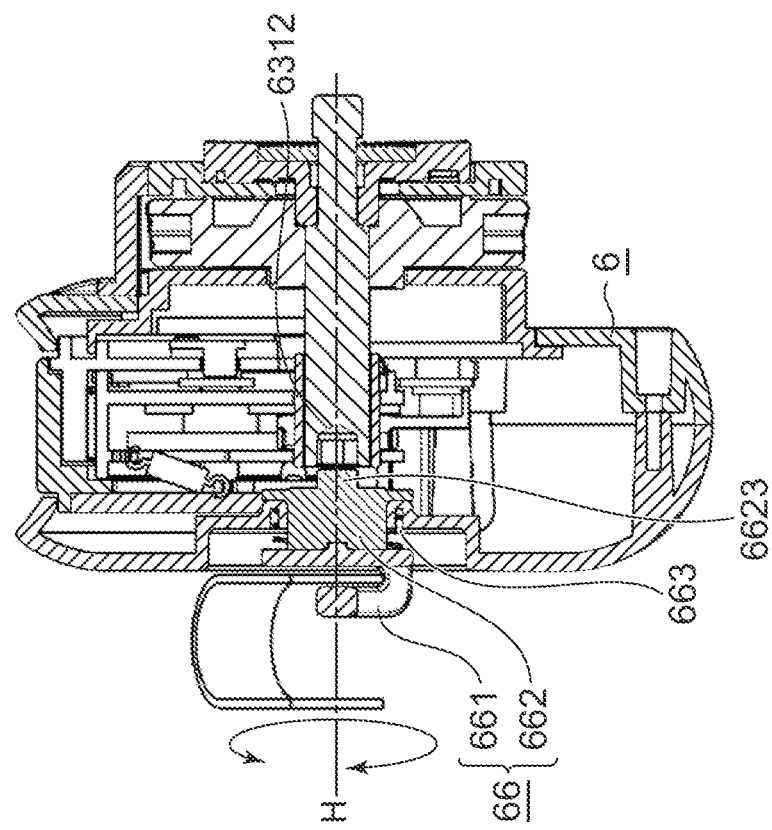

GRIPPING DEVICE AND ELECTRONIC APPARATUS WITH GRIPPING DEVICE

BACKGROUND OF THE INVENTION

Field of the Invention

The present invention relates to a gripping device and an electronic apparatus using the gripping device, and in particular, relates to a gripping device attached to an electronic apparatus.

Description of the Related Art

Generally, some electronic apparatuses, such as digital cameras (hereinafter referred to as cameras, simply), include grip portions for handheld shooting. For example, in many cameras, a convex portion is formed as a grip portion in the front of a camera body so that a finger can hook the grip portion easily, and various operation members are arranged at a position to which a finger reaches in a state where a user grips the grip portion. The grip portion is formed in a shape so that an electronic apparatus is stabilized in a specified holding style.

For example, the grip portion is formed so that a user can easily grip an electronic apparatus when height of the electronic apparatus coincides with height of a user's face. Accordingly, when a user uses the electronic apparatus at a high position (what is called a high angle) or a low position (what is called a low angle) with respect to the user, the user becomes difficult to grip the grip portion.

In considering such a problem, there is a known technique to configure a grip portion to be a rotatable gripping device so as to change an angle of the gripping device to a desired angle (Japanese Laid-Open Patent Publication (Kokai) No. 2005-181718 (JP 2005-181718A)).

However, the gripping device disclosed in the above-mentioned publication is equipped with a plurality of operation buttons, such as a release button, a setting button, and a cross joint button, on its side surface. Accordingly, since a user needs to properly use the operation buttons whenever the user performs various operations, the user is troublesome. Moreover, the camera may be controlled in a way that is unexpected by the user due to a wrong press of an operation button by the user.

SUMMARY OF THE INVENTION

The present invention provides a gripping device that enables a user to operate operation members like switches favorably and an electronic apparatus using the gripping device.

Accordingly, a first aspect of the present invention provides a gripping device that is attached to an electronic apparatus and is used for gripping the electronic apparatus, the gripping device including a gripping member of which a side surface is approximately circular, and an operation member that has an operation panel arranged along a circumference of the gripping member and that is operated for causing a predetermined action of the electronic apparatus. The operation member allows at least a first operation that presses the operation panel in a radial direction of the gripping member and a second operation that slides the operation panel in a circumferential direction of the gripping member from a position moved by the first operation.

Accordingly, a second aspect of the present invention provides an electronic apparatus including a controller, and a gripping device that is attached to the electronic apparatus and is used for gripping the electronic apparatus. The gripping device includes a gripping member of which a side surface is approximately circular, and an operation member that has an operation panel arranged along a circumference of the gripping member and that is operated for causing a predetermined action of the electronic apparatus. The operation member allows at least a first operation that presses the operation panel in a radial direction of the gripping member and a second operation that slides the operation panel in a circumferential direction of the gripping member from a position moved by the first operation. The controller controls the electronic apparatus to perform a first action in a case where the first operation is released after the first operation is performed. And the controller controls the electronic apparatus to perform a second action in a case where the second operation is performed after the first operation is performed.

Accordingly, a third aspect of the present invention provides an electronic apparatus including a controller, and a gripping device that is attached to the electronic apparatus and is used for gripping the electronic apparatus. The gripping device includes a gripping member of which a side surface is approximately circular, and an operation member that has an operation panel arranged along a circumference of the gripping member and that is operated for causing a predetermined action of the electronic apparatus. The operation member includes a first operation member that is rotatable around a rotation axis and a second operation member that is rotatable around the rotation axis in conjunction with the first operation member. The operation member allows at least a first operation that presses the operation panel in a radial direction of the gripping member and a second operation that slides the operation panel in a circumferential direction of the gripping member from a position moved by the first operation. The controller controls the electronic apparatus to perform a first action in a case where the second operation member is returned to a predetermined neutral holding position after sliding the second operation member by a predetermined amount. And the controller controls the electronic apparatus to perform a second action in a case where the first operation member and the second operation member are rotated after sliding the second operation member by the predetermined amount.

According to the present invention, a user is able to operate the operation member of the gripping device satisfactorily.

Further features of the present invention will become apparent from the following description of exemplary embodiments with reference to the attached drawings.

BRIEF DESCRIPTION OF THE DRAWINGS

FIG. 19A and FIG. 19B are perspective views for describing an example of the gripping device in a second embodiment of the present invention.

FIG. 20A and FIG. 20B are perspective views for describing an example of the gripping device in a third embodiment of the present invention.

FIG. 24A and FIG. 24B are sectional views showing the gripping device shown in FIG. 20A.

DESCRIPTION OF THE EMBODIMENTS

Hereafter, examples of gripping devices according to embodiments of the present invention will be described with reference to the attached drawings.

Figure 1A:
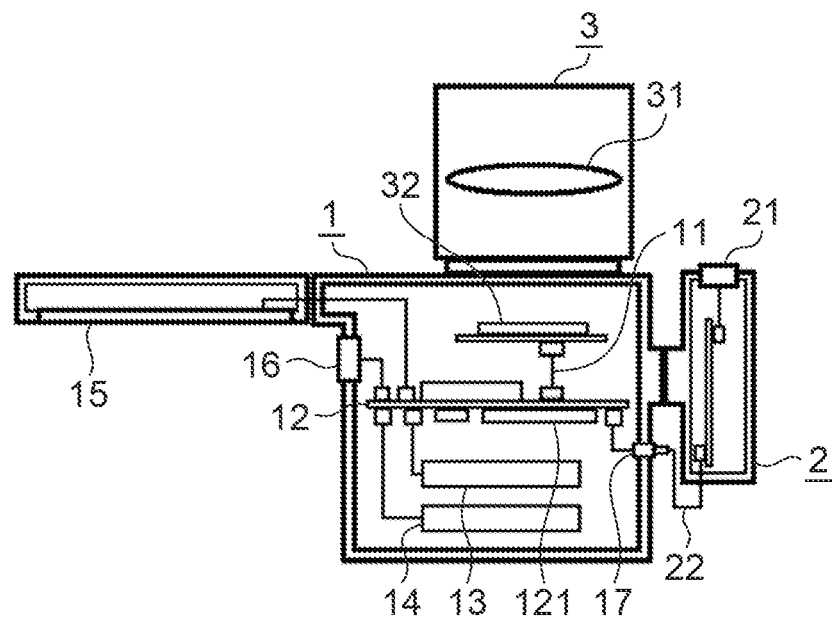
FIG. 1A and FIG. 1B are views for describing an example of an electronic apparatus that uses a gripping device in a first embodiment of the present invention.
Figure 1B:
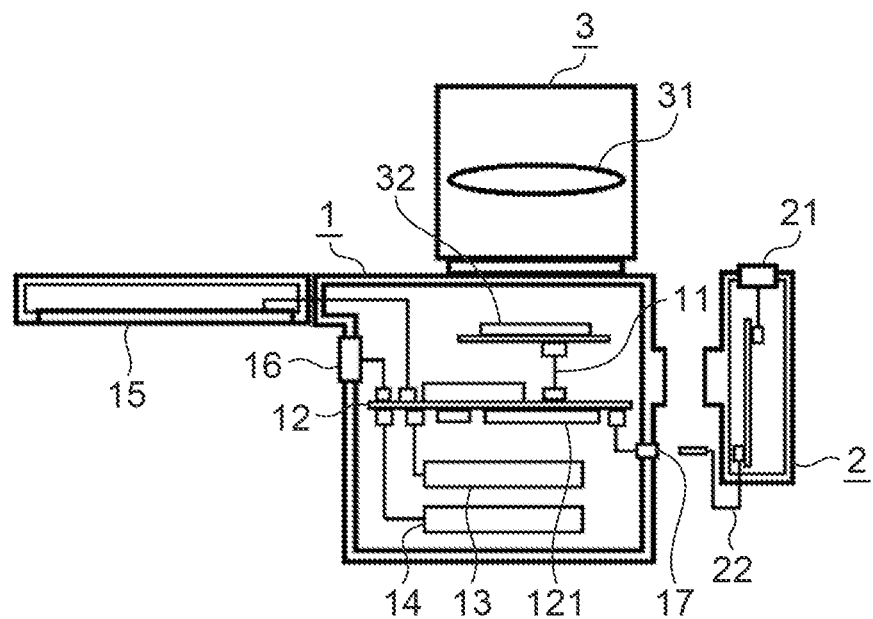

FIG. 1A and FIG. 1B are views for describing an example of an electronic apparatus that uses a gripping device according to a first embodiment of the present invention. FIG. 1A is a view showing a state where the electronic apparatus was equipped with the gripping device. FIG. 1B is a view showing a state where the gripping device is detached from the electronic apparatus.

In the following description, an image pickup apparatus like a digital camera is described as an example of the electronic apparatus. However, the present invention is applicable to an electronic apparatus other than the image pickup apparatus as long as the apparatus is used by gripping.

The illustrated image pickup apparatus (hereinafter referred to as a camera) is configured so that the gripping device 2 can be detached from a camera body 1. In the state shown in FIG. 1A, a user uses the camera by gripping it by a hand, for example. The state shown in FIG. 1B is used in a case where size and weight should be reduced, such as a case where the camera is mounted on a drone etc.

The camera body 1 is provided with a lens barrel 3 including a lens 31 as shown in FIG. 1A. The lens barrel 3 may be detachable from the camera body 1 using a known mount, such as a bayonet.

The camera body 1 is provided with an image sensor 32. The image sensor 32 outputs an image signal corresponding to an optical image formed by light flux entered through the lens (image pickup optical system) 31. Then, the image signal concerned is sent to a substrate 12 through a flexible substrate 11. A controller 121 provided in the substrate 12 sends the image signal to a display unit 15 so as to display a through image. Furthermore, the controller 121 applies a predetermined image process to the image signal and records the processed signal on a recording unit 13 as image data.

A power supply unit 14 supplies electric power to the camera. A camera body operation member 16 is provided with an operation switch for instructing start and stop of recording on the recording unit 13. Furthermore, the camera body operation member 16 is provided with an adjusting switch for changing a field angle of the lens 31 and a power switch for turning ON/OFF of the power source of the camera body 1. The controller 121 performs a control process concerning the camera in response to an instruction through the camera body operation member 16.

The gripping device 2 is arranged in a direction that intersects an optical axis of the lens 31, and the gripping device 2 is provided with an operation member 21. A user is able to perform operations to start and stop recording on the recording unit 13 through the operation member 21 (hereinafter referred to as a trigger function). Furthermore, a user is able to perform an operation to change the field angle of the lens 31 through the operation member 21 (hereinafter referred to as a zoom function).

It should be noted that the operation member 21 may allow a user to perform an operation for switching photography and reproduction and an operation for adjusting focus in addition to the above-mentioned trigger function and zoom function. The operation for switching photography and reproduction is called a photography/reproduction switching function, and the operation for adjusting focus is called a focusing function.

Electric power is supplied to the operation member 21 from a power supply unit 14 through a camera body communication unit 17 and grip communication unit 22. Moreover, when a user operates the operation member 21, a signal corresponding to the operation of the operation member 21 is sent to the substrate 12 through the grip communication unit 22 and camera body communication unit 17. The controller 121 controls the camera according to an operation signal. It should be noted that details of the operation member 21 will be mentioned later.

Figure 2A:
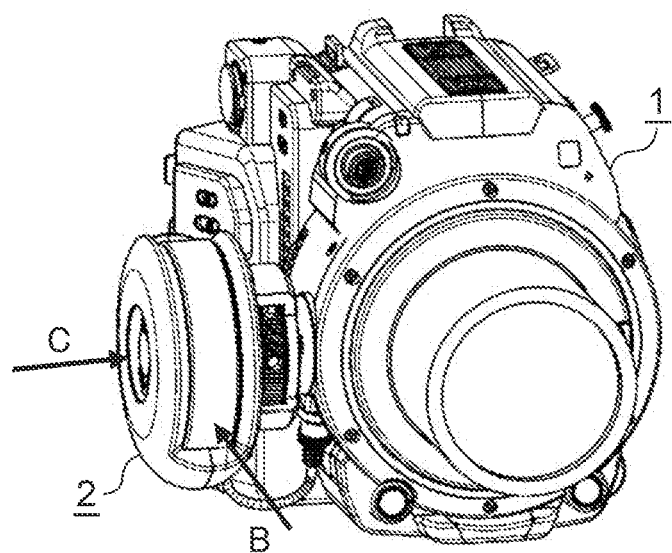
FIG. 2A and FIG. 2B are the perspective views showing external appearances of a camera body and the gripping device shown in FIG. 1A.
Figure 2B:
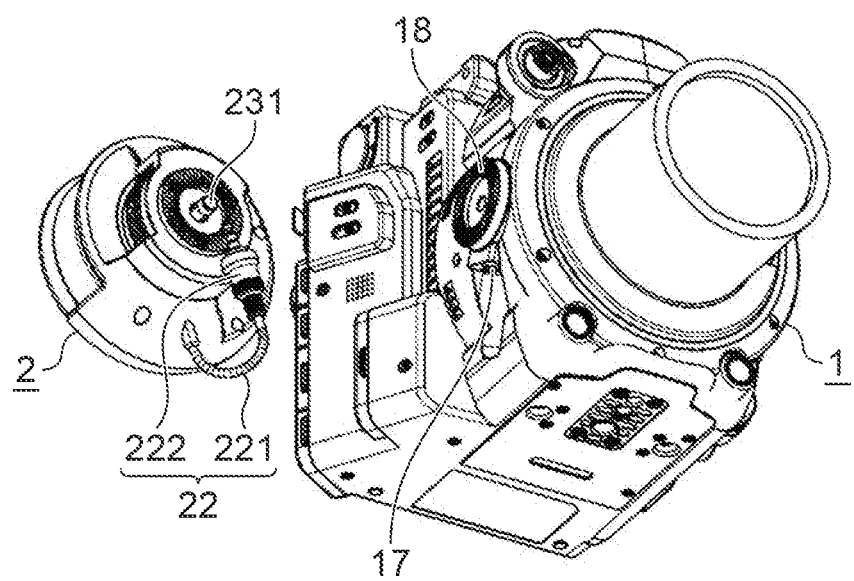

FIG. 2A and FIG. 2B are perspective views showing an external appearance of the camera body and gripping device shown in FIG. 1A. FIG. 2A is a perspective view showing a state where the camera body is equipped with the gripping device. FIG. 2B is a perspective view showing a state where the gripping device is detached from the camera body. It should be noted that FIG. 2B is shown in a state where a camera-body attachment member 18 and fixing member 231 appear for convenience of description.

The gripping device 2 is fixed to the camera body 1 by fixing a thread section formed at the front end of the fixing member 231 to the camera-body attachment member 18 at an arbitrary angle using a rosette etc. The grip communication unit 22 has a communication wire 221 and communication terminal 222. The communication terminal 222 is connected to the camera body communication unit 17, which enables power supply and communication to the gripping device 2.

Figure 3A:
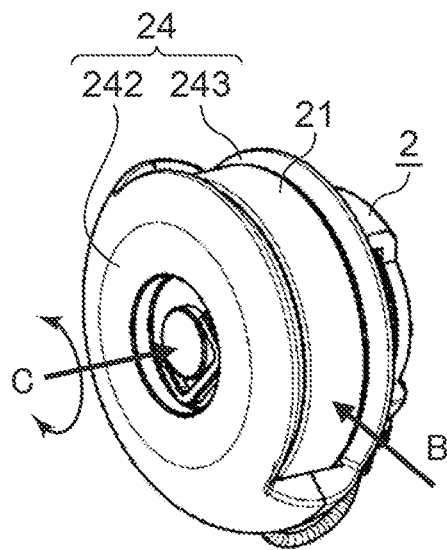
FIG. 3A through FIG. 3D are views for describing an operation member provided in the gripping device shown in FIG. 2.
Figure 3B:
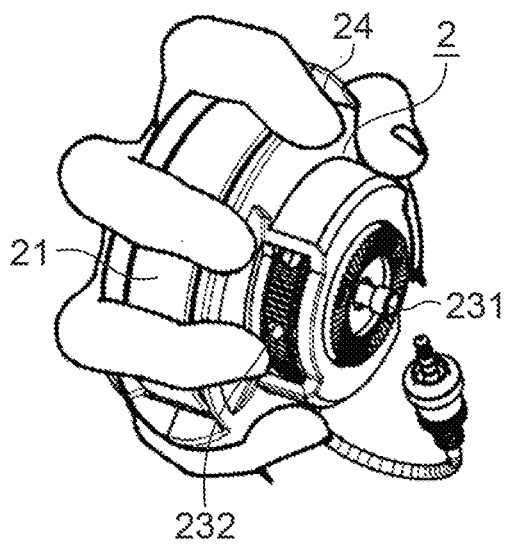
Figure 3C:
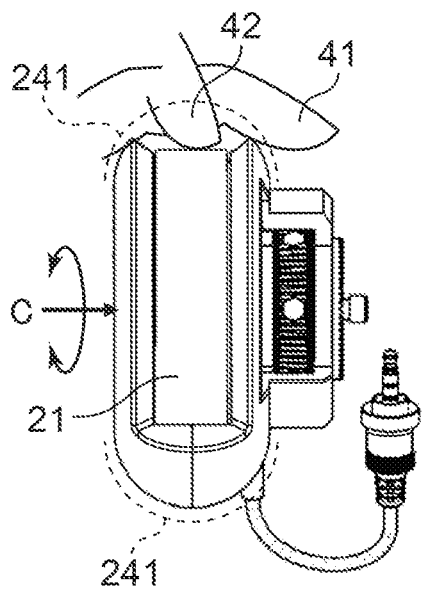
Figure 3D:
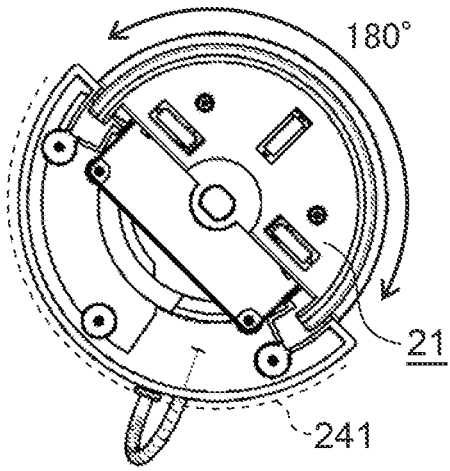

FIG. 3A through FIG. 3D are views for describing the operation member 21 provided in the gripping device 2 shown in FIG. 2A. FIG. 3A is a perspective view showing the gripping device. FIG. 3B is a perspective view showing a gripping style of the gripping device in a non-operation time. Moreover, FIG. 3C is a front view showing the gripping device viewed from the front side of the camera in a direction indicated by a solid line arrow B in FIG. 2A. FIG. 3D is a view showing the gripping device viewed in an attachment direction indicated by a solid line arrow C in FIG. 2A. It should be noted that an upside surface member 242 is not shown in FIG. 3D for convenience of description.

The gripping device 2 has a gripping member 24 that is attachable to the camera body 1 in an arbitrary angle around an axis shown by the solid line arrow C. The gripping member 24 of which a side surface is approximately circular is provided with a pair of side face members 242 and 243. Then, a predetermined space is prescribed between the side face members 242 and 243. An operation panel of the operation member 21 is arranged along a circumference of the gripping member 24 (i.e., along the above-mentioned space). A user grips the gripping device 2 by hooking fingers to ends 241 of the side face members 242 and 243.

Since the operation panel of the operation member 21 is positioned at the side inner than the ends 241 (outer peripheral edges), a user's finger 41 does not touch the operation member 21 erroneously in the non-operation time. When operating the operation member 21, the user needs to move the finger to the position indicated by a reference numeral 42 to touch the operation member 21.

As shown in FIG. 3C, the operation panel of the operation member 21 is exposed in an angular range of 180 degrees in a circumferential direction. The user is able to touch the operation panel of the operation member 21 in the exposed range concerned. The fixing member 231 rotates in conjunction with a fixed operating member 232. The front end of the fixing member 231 is threaded. The user is able to screw and fix the gripping device 2 to the camera body 1 by rotating the fixing member 231 and is able to release the fixation.

Figure 4:
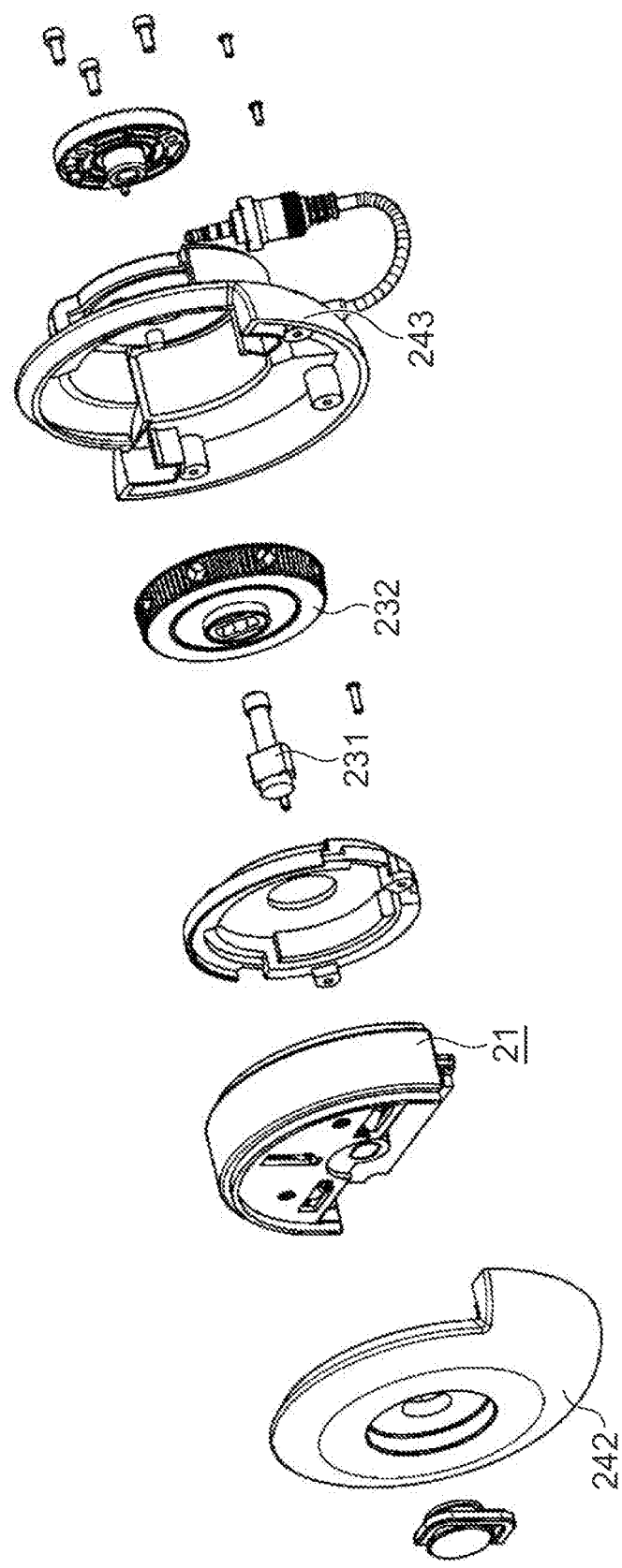
FIG. 4 is an exploded perspective view showing the gripping device shown in FIG. 3A.

FIG. 4 is an exploded perspective view showing the gripping device shown in FIG. 3A.

As illustrated, the operation member 21, fixing member 231, and fixed operating member 232 are sandwiched between the side face member 242 and side face member 243. Then, the operation member 21 is fixed to the side face member 242 and side face member 243.

Figure 5:
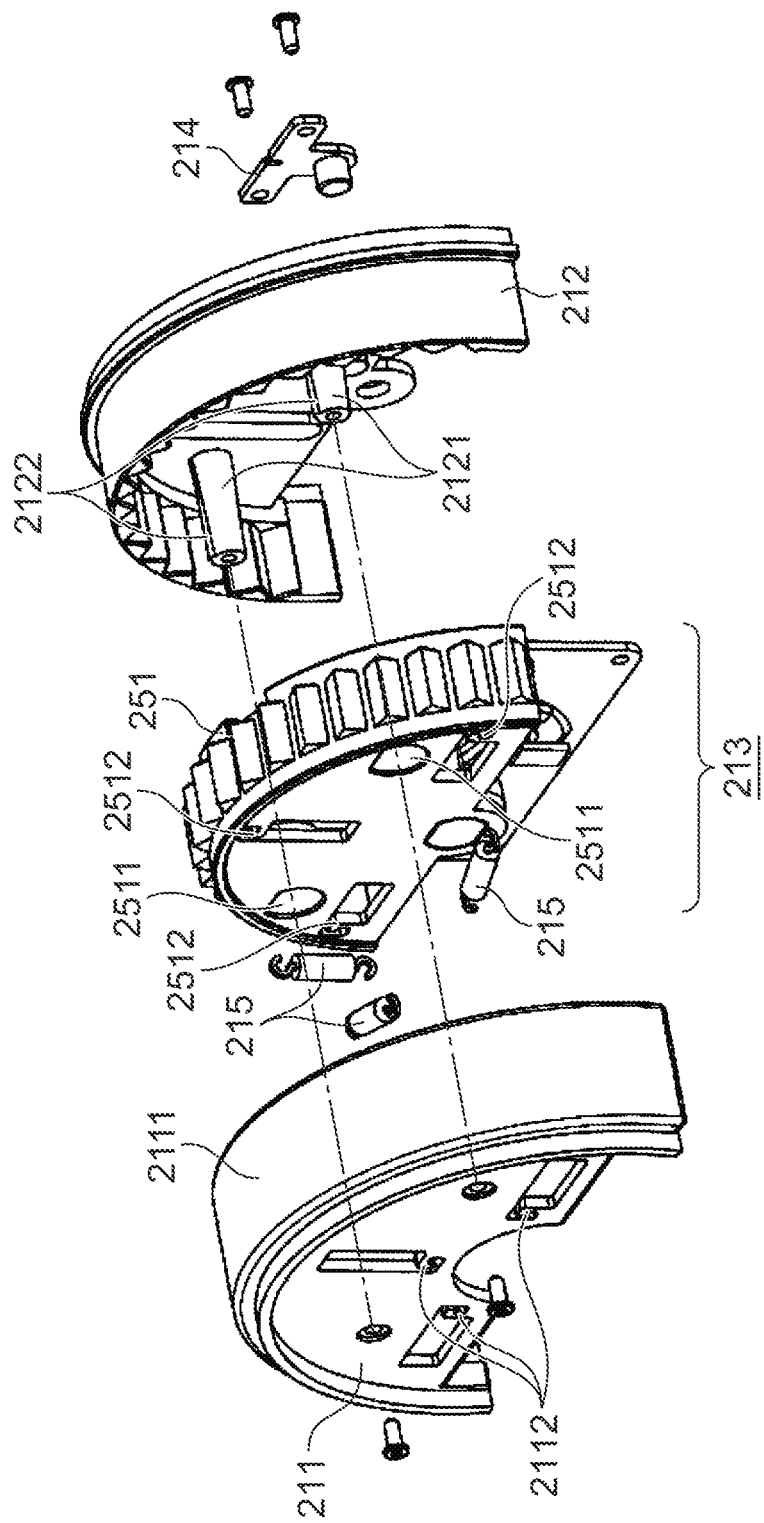
FIG. 5 is an exploded perspective view showing the operation member shown in FIG. 3A.

FIG. 5 is an exploded perspective view showing the operation member 21 shown in FIG. 3A.

As illustrated, the operation member 21 is provided with a trigger member 211, a trigger base member 212, a zoom unit 213, a trigger operation detection unit 214, and trigger springs 215. It should be noted that assembly of the operation member 21 will be mentioned later.

Figure 6C:
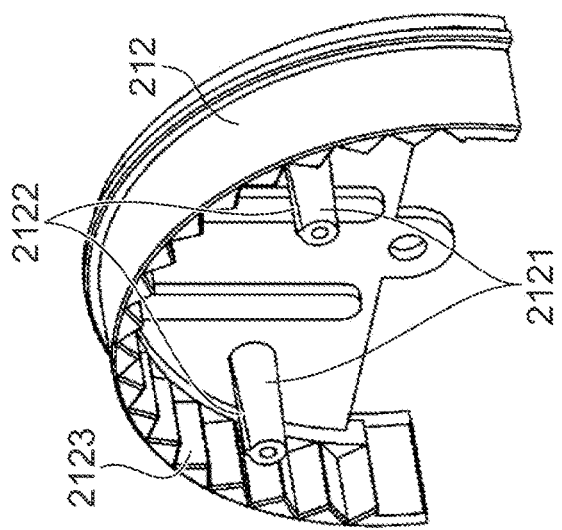
FIG. 6A through FIG. 6C are perspective views for describing components that constitute the operation member shown in FIG. 5.
Figure 6B:
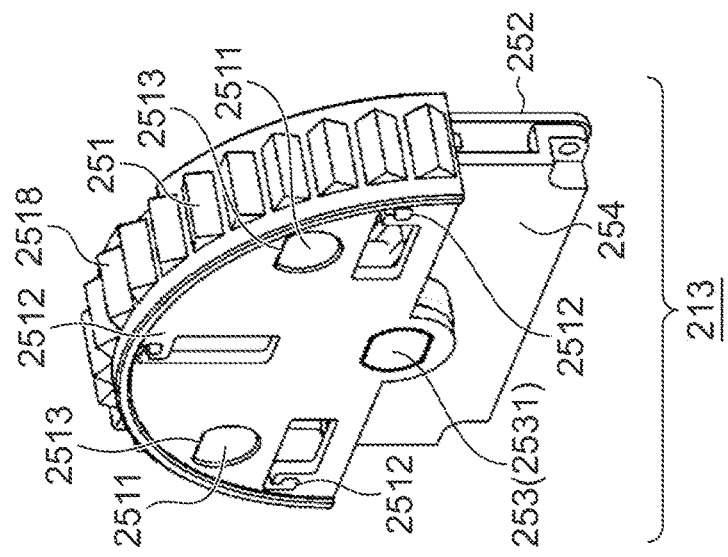
Figure 6A:
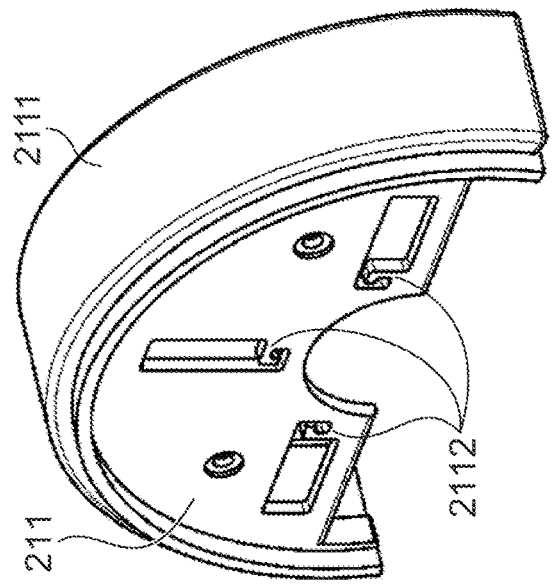

FIG. 6A through FIG. 6C are perspective views for describing the components that constitute the operation member shown in FIG. 5. FIG. 6A is a perspective view showing the trigger member. FIG. 6B is a perspective view showing the zoom unit. Moreover, FIG. 6C is a perspective view showing the trigger base member.

As shown in FIG. 5 and FIG. 6A through FIG. 6C, the trigger member 211 is a semicircular member and its circumferential surface is the operation panel 2111 of an arc shape. A plurality of rack pawls 2112 are formed on the side surface of the trigger base member 211. A pair of bosses 2121 are formed on the side surface of the trigger base member 212. Furthermore, a concavo-convex pattern 2123 is formed along the inner circumferential surface of the trigger base member 212. Moreover, a rib 2122 prolonged in a longitudinal direction is formed on a side surface of each of the bosses 2121.

The zoom unit 213 has the zoom operation detection unit 253 that is provided with a zoom operation member 251 and a shaft 2531 (details will be mentions later), a zoom base member 254, and an operation detection board 252. The zoom operation member 251 is a semicircular member that has a concavo-convex pattern 2518 on its outer circumferential surface. Furthermore, holes 2511 and rack pawls 2512 are formed in the side surface of the zoom operation member 251. It should be noted that one end (upper end in the drawing) of each of the holes 2511 is formed as a flat surface 2513 as shown in FIG. 6B.

The trigger base member 212 is fixed to the trigger member 211 by inserting the bosses 2121 through the holes 2511 formed in the zoom unit 213. At this occasion, each of the trigger springs 215 is hooked between the rack pawl 2112 and the rack pawl 2512 so as to energize the trigger member 211 and zoom unit 213.

Figure 7A:
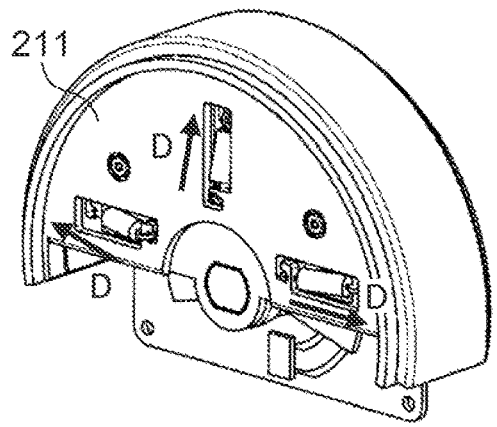
FIG. 7A through FIG. 7C are views for describing a holding mechanism of a trigger member and a sub unit prescribed by a trigger base member shown in FIG. 6A and FIG. 6C to a zoom unit.
Figure 7B:
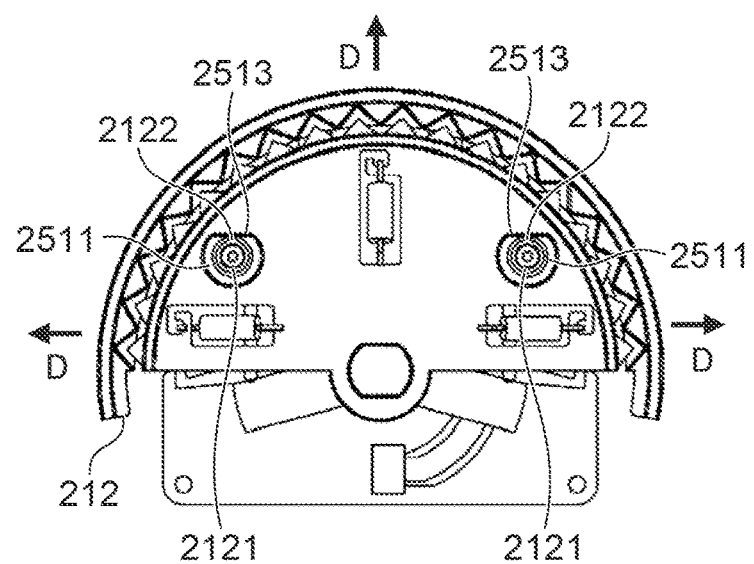
Figure 7C:
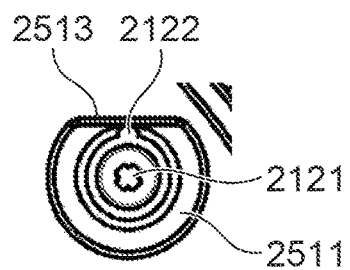

FIG. 7A through FIG. 7C are views for describing attachment of a subunit that consists of the trigger member and trigger base member shown in FIG. 6A and FIG. 6C to the zoom unit. FIG. 7A is a perspective view showing the trigger member. FIG. 7B is a view showing the subunit except the trigger member. Moreover, FIG. 7C is a view showing assembly of the subunit.

As shown in FIG. 7C, the subunit that consists of the trigger member 211 and trigger base member 212 is movable in a range of a gap between the boss 2121 and hole 2511, and the movement is regulated because the rib 2122 contacts the flat surface 2513. The subunit is held by the zoom unit 213 in a state where the subunit is energized with respect to the zoom unit 213 in directions indicated by solid line arrows D.

Figure 8B:
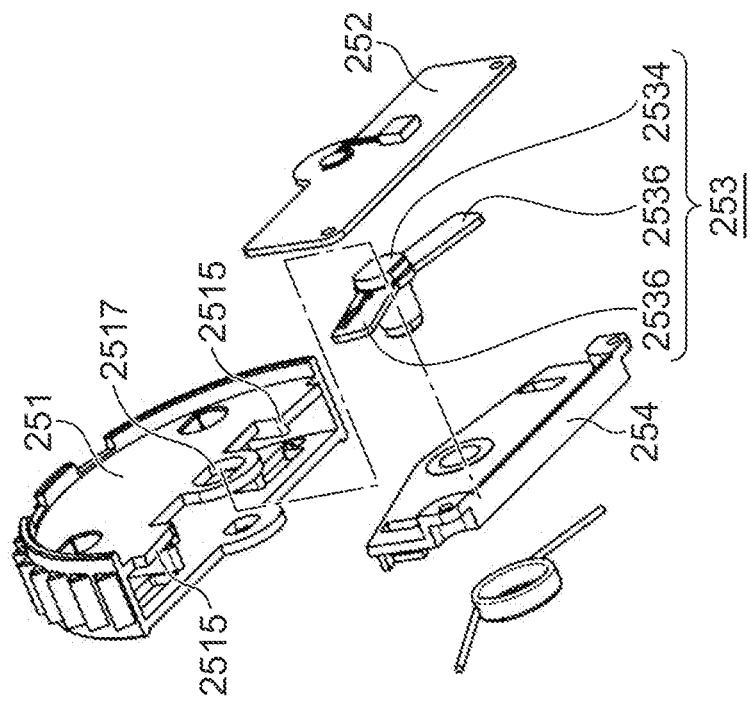
FIG. 8A and FIG. 8B are exploded perspective views showing the zoom unit shown in FIG. 6B.
Figure 8A:
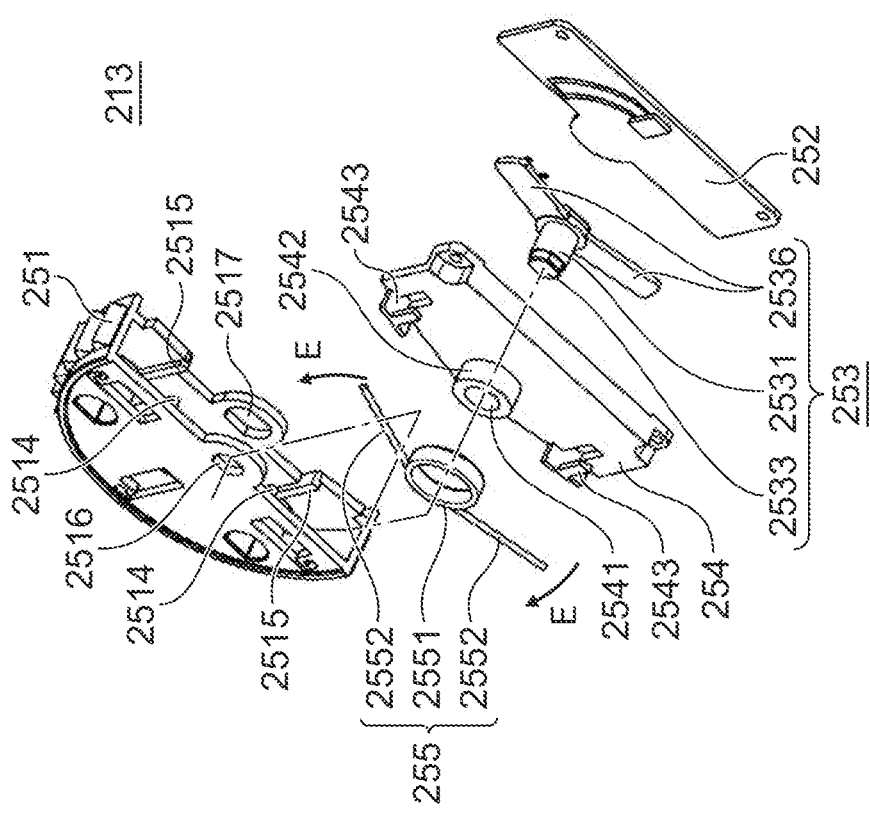

FIG. 8A and FIG. 8B are exploded perspective views showing the zoom unit shown in FIG. 6B. FIG. 8A is a perspective view viewed from a lower front side. FIG. 8B is a perspective view viewed from a lower rear side. A zoom operation detection system used by the zoom unit 213 is what is called a known variable resistance system. The zoom unit 213 has the zoom operation member 251, the operation detection board 252, the zoom operation detection unit 253, the zoom base member 254, and a torsion spring 255. Then, the torsion spring 255 generates energization force in directions indicated by solid line arrows E by centrifugal distortion of arms 2552 centering on the winding section 2551.

Figure 9:
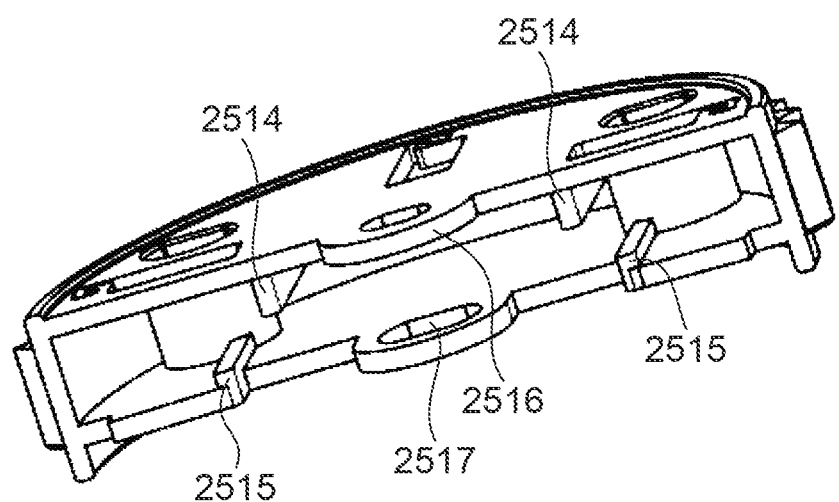
FIG. 9 is a perspective view showing details of a zoom operation member shown in FIG. 8A and FIG. 8B.

FIG. 9 is a perspective view showing the zoom operation member shown in FIG. 8A and FIG. 8B in detail.

A pair of ribs 2514 are formed in the inner surface of one side wall of the zoom operation member 251, and a pair of ribs 2515 are formed in the inner surface of the opposite side wall. Furthermore, a fitting hole 2516 is formed in the above-mentioned one side wall, and a fitting hole 2517 is formed in the opposite side wall.

Figure 10A:
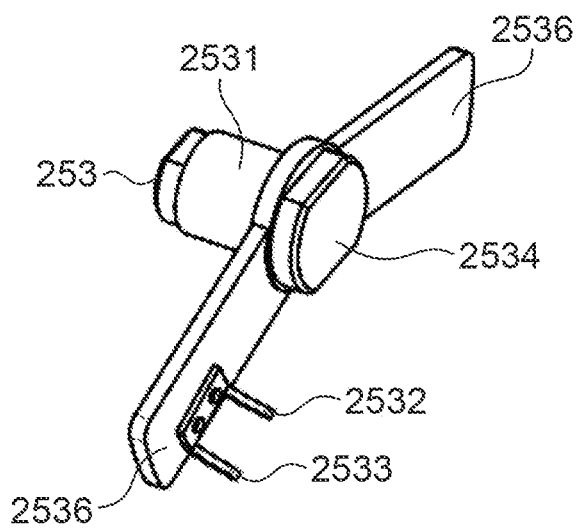
FIG. 10A and FIG. 10B are perspective views showing details of a zoom operation detection unit shown in FIG. 6B.
Figure 10B:
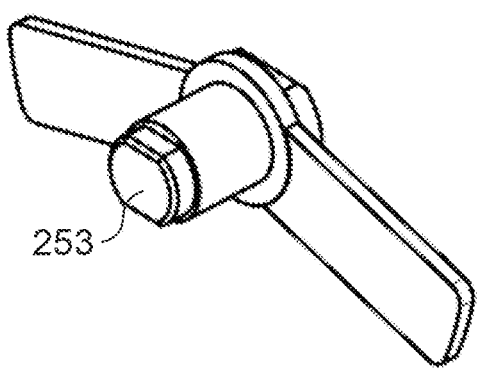

FIG. 10A and FIG. 10B are perspective views showing the zoom operation detection unit shown in FIG. 6B in detail. FIG. 10A is a perspective view viewed from an oblique front side. FIG. 10B is a perspective view viewed from an oblique rear side.

The zoom operation detection unit 253 has the shaft 2531 to which a pair of arms 2536 prolonged outward in radial directions are attached. Then, brushes 2532 and 2533 are provided in one of the arms 2536. Furthermore, fitting sections 2534 and 2535 are respectively formed on both ends of the shaft 2531.

The brushes 2532 and 2533 are made from conductive material and are electrically connected mutually. It should be noted that the brushes 2532 and 2533 are fixed by thermal caulking to the arm 2536.

With reference to FIG. 8A and FIG. 8B again, fitting of the shaft 2531 of the zoom operation detection unit 253 is rotatably fitted into a hole 2541 formed in the zoom base member 254. The torsion spring 255 is held at the zoom operation detection unit 253 by fitting the winding section 2551 to a cylindrical section 2542 and by hooking the arms 2552 to pawls 2543.

The zoom operation detection unit 253 is assembled to the zoom operation member 251 by respectively fitting the fitting sections 2534 and 2535 formed in the zoom operation detection unit 253 to the fitting holes 2516 and 2517.

In the illustrated example, the zoom operation detection unit 253 is assembled while elastically deforming the zoom operation member 251 so as to expand the space between the fitting holes 2516 and 2517. At this occasion, the ribs 2515 contact the arms 2536, so that the zoom operation detection unit 253 rotates in conjunction with the zoom operation member 251 (details will be mentioned later by referring to FIG. 14C). Moreover, the ribs 2514 contact the arms 2552 of the torsion spring 255, so that the zoom operation member 251 and zoom operation detection unit 253 are held at a neutral position (details will be mentioned later by referring to FIG. 14D).

Figure 11A:
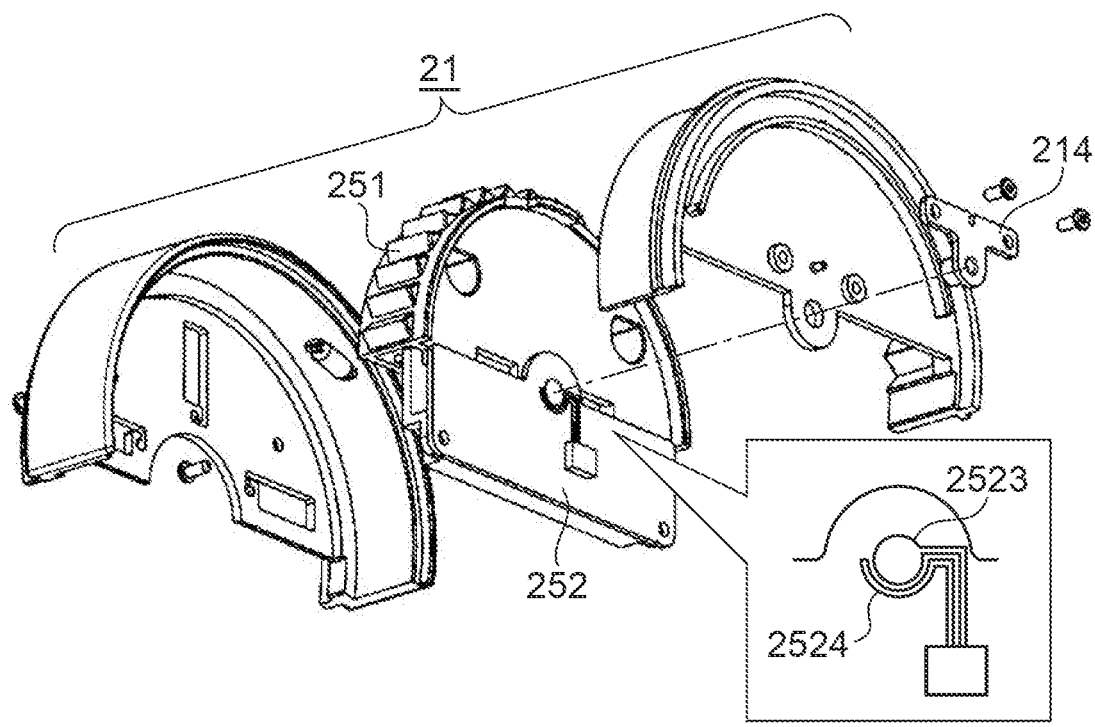
FIG. 11A and FIG. 11B are views for describing a trigger operation detection unit shown in FIG. 5.
Figure 11B:
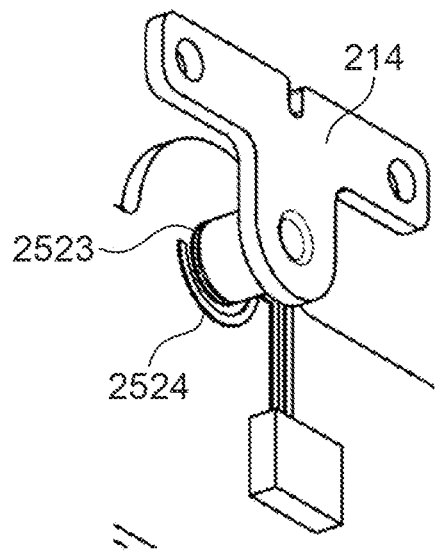

FIG. 11A and FIG. 11B are views for describing the trigger operation detection unit shown in FIG. 5. FIG. 11A is an exploded perspective view showing the operation member. FIG. 11B is a perspective view showing the trigger operation detection unit.

The trigger operation detection unit 214 is made from conductive material. A circular electrode pattern 2523 and semicircular ring electrode pattern 2524, which is concentric to the electrode pattern 2523, are implemented in the operation detection board 252. As shown in FIG. 11B, the trigger operation detection unit 214 contacts only the electrode pattern 2523 when assembling.

Figure 12A:
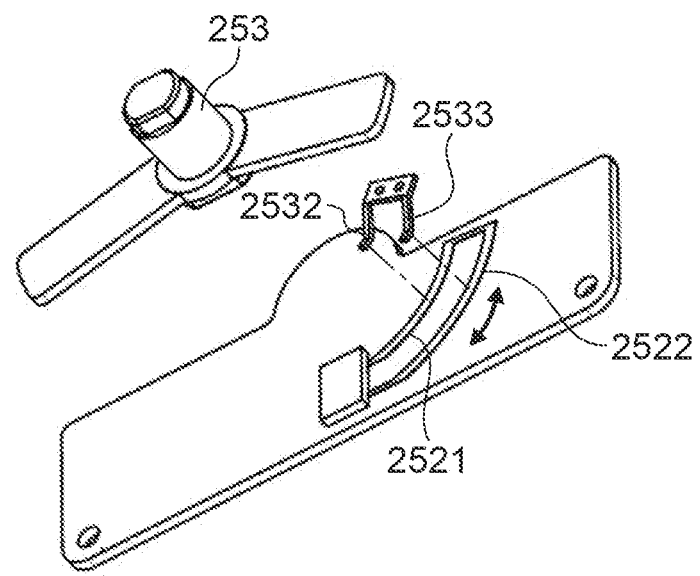
FIG. 12A and FIG. 12B are views for describing zoom operation detection by the zoom operation detection unit shown in FIG. 10.
Figure 12B:
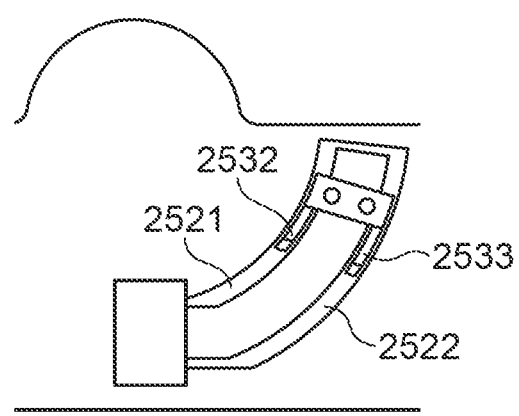

FIG. 12A and FIG. 12B are views for describing zoom operation detection by the zoom operation detection unit shown in FIG. 10A and FIG. 10B. FIG. 12A is a perspective view separating and showing the zoom operation detection unit and operation detection board. FIG. 12B is a view showing the zoom operation detection.

Arc electrode patterns 2521 and 2522 are implemented on the operation detection board so that the electrode patterns 2521 and 2522 will be concentric. Each of the electrode patterns 2521 and 2522 has electric resistance.

The brushes 2532 and 2533 respectively slide along the electrode patterns 2521 and 2522 in synchronization with the rotation of the zoom operation detection unit 253. Since total resistance of the serially connected electrode patterns 2521 and 2522 depends on the contact positions of the brushes 2532 and 2533, the zoom operation is detected on the basis of the total resistance. FIG. 12B shows a positional relationship between the brushes 2532 and 2533 and the electrode patterns 2521 and 2522 at the neutral holding position.

FIG. 13A through FIG. 13F are views for describing an action of the operation member shown in FIG. 3A when a user applies a press operation to the operation member. It should be noted that the trigger member 211 is not shown in FIG. 13A through FIG. 13F for convenience of description.

Figure 13C:
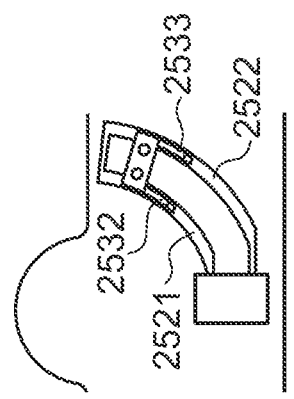
FIG. 13A through FIG. 13F are views for describing an action when a user presses the operation member shown in FIG. 3.
Figure 13B:
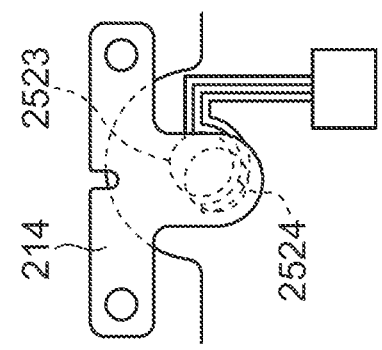
Figure 13A:
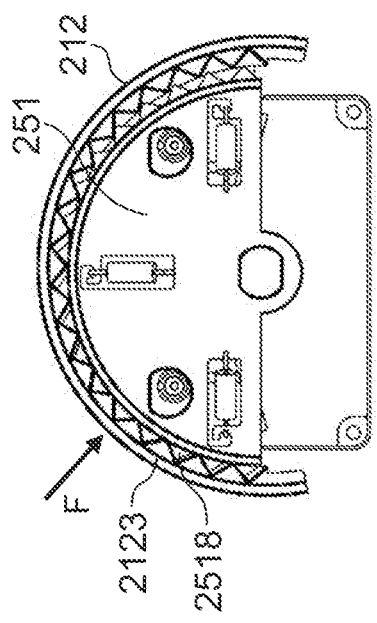

FIG. 13A shows an arrangement of the operation member 21 when a user presses the trigger member 211 in a direction shown by a solid line arrow F. As illustrated, the trigger member 211 and trigger base member 212 move, and a part of the concavo-convex pattern 2123 formed in the trigger base member 212 meshes with a part of concavo-convex pattern 2518 formed in the zoom operation member 251.

FIG. 13B shows an action of the trigger operation detection unit 214 in the state shown in FIG. 13A. In this state, the trigger operation detection unit 214 moves to a position to contact both the electrode patterns 2523 and 2524.

FIG. 13C shows the positional relationship between the brushes 2532 and 2533 and the electrode patterns 2521 and 2522 in the position shown in FIG. 13A. This positional relationship is the same as that in FIG. 12B. That is, it is in the state of the neutral holding position.

Figure 13F:
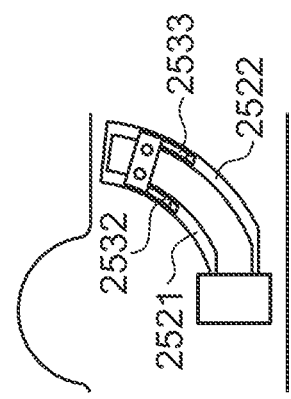
Figure 13E:
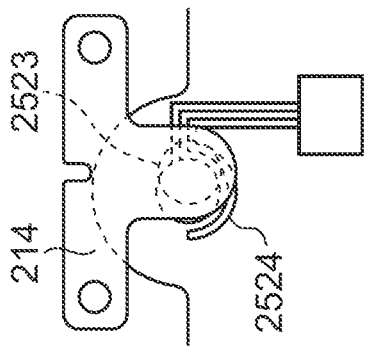
Figure 13D:
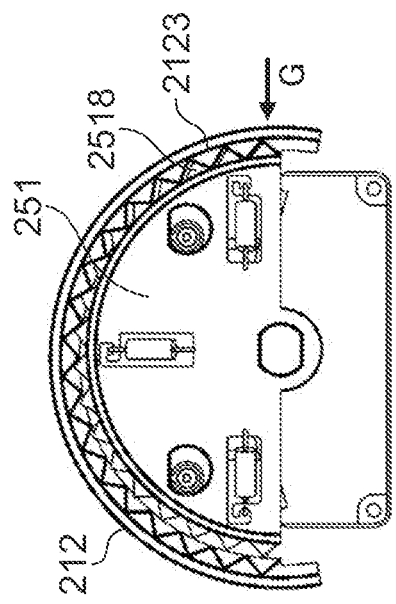

FIG. 13D shows an arrangement of the operation member 21 when a user presses the trigger member 211 in a direction shown by a solid line arrow G. In this case, the trigger member 211 and trigger base member 212 move, and a part of the concavo-convex pattern 2123 formed in the trigger base member 212 meshes with a part of concavo-convex pattern 2518 formed in the zoom operation member 251.

FIG. 13E shows an action of the trigger operation detection unit 214 in the arrangement shown in FIG. 13D. In this state, the trigger operation detection unit 214 moves to a position to contact both the electrode patterns 2523 and 2524.

FIG. 13F shows the positional relationship between the brushes 2532 and 2533 and the electrode patterns 2521 and 2522 in the position shown in FIG. 13D. This positional relationship is the same as that in FIG. 12B. That is, it is in the state of the neutral holding position.

As described using FIG. 13A through FIG. 13F, the operation member 21 allows a press operation in radial directions within a range of approximately 180 degrees in the circumferential direction and is able to detect the operation concerned.

Figure 14A:
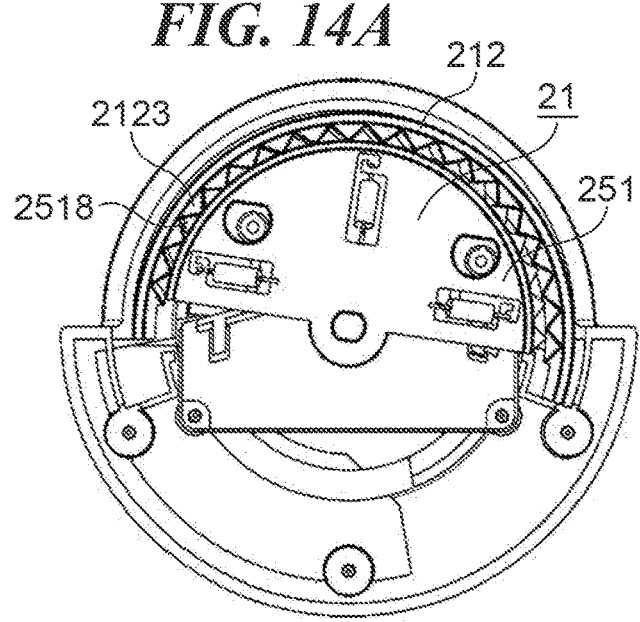
FIG. 14A through FIG. 14E are views for describing an action when the user rotates the operation member shown in FIG. 3 after the press operation.
Figure 14B:
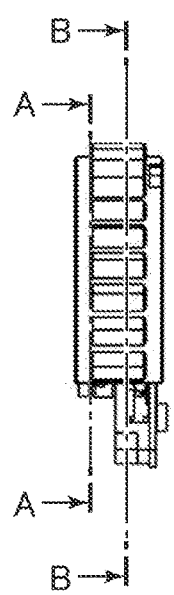
Figure 14C:
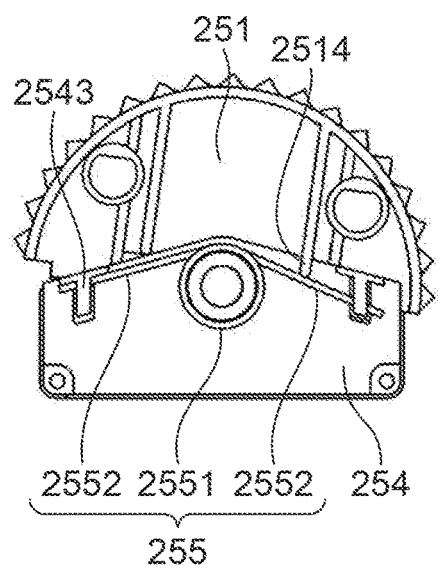
Figure 14D:
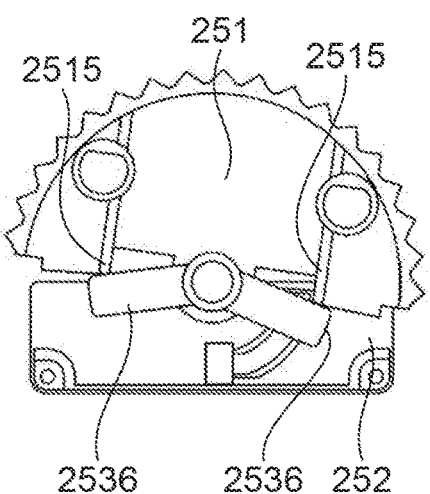
Figure 14E:
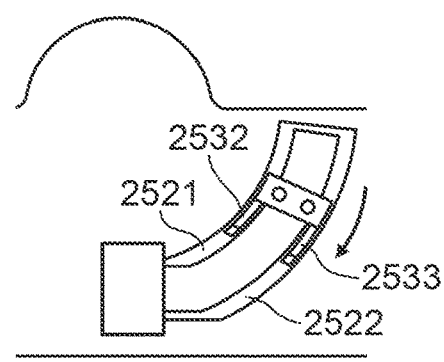

FIG. 14A through FIG. 14E are views for describing an action of the operation member shown in FIG. 3A when a user applies a press operation to the operation member. FIG. 14A is a partially broken view showing the operation member. FIG. 14B is a side view of the operation member. Moreover, FIG. 14C is a sectional view taken long a line A-A in FIG. 14B. FIG. 14D is a sectional view taken along a line B-B in FIG. 14B. Furthermore, FIG. 14E is a view showing contact of the brushes and electrode patterns.

FIG. 14A does not show the trigger member 211. FIG. 14C shows only the zoom operation member 251, zoom base member 254, and torsion spring 255. The zoom operation member 251 is shown as a cross section in FIG. 14C. Furthermore, FIG. 14D shows only the zoom operation member 251, zoom operation detection unit 253, and operation detection board 252. The zoom operation member 251 is shown as a cross section in FIG. 14D.

It should be noted that a rotational operation after the press operation shown in FIG. 13A will be described below.

Since the part of the concavo-convex pattern 2518 meshes with the part of the concavo-convex pattern 2123, the zoom operation member 251 rotates in conjunction with the rotational operation of the subunit, which consists of the trigger member 211 and the trigger base member 212, in the circumferential direction. At this occasion, since the rib 2514 presses the one arm 2552 of the torsion spring 255 as shown in FIG. 14C, the torsion spring 255 produces force in the direction returning to the neutral holding position.

Furthermore, the rib 2515 contacts the arm 2536 and rotates the zoom operation detection unit 253 as shown in FIG. 14D. At this occasion, the brushes 2532 and 2533 respectively slide along the electrode patterns 2521 and 2522 and the contact positions change as shown in FIG. 14E.

The signals that occur in response to the actions described using FIG. 13A through FIG. 13F and FIG. 14A through FIG. 14E are sent to the controller 121 through the grip communication unit 22 and the camera body communication unit 17, as described by referring to FIG. 1. Then, the controller 121 performs a process mentioned later.

Figure 15:
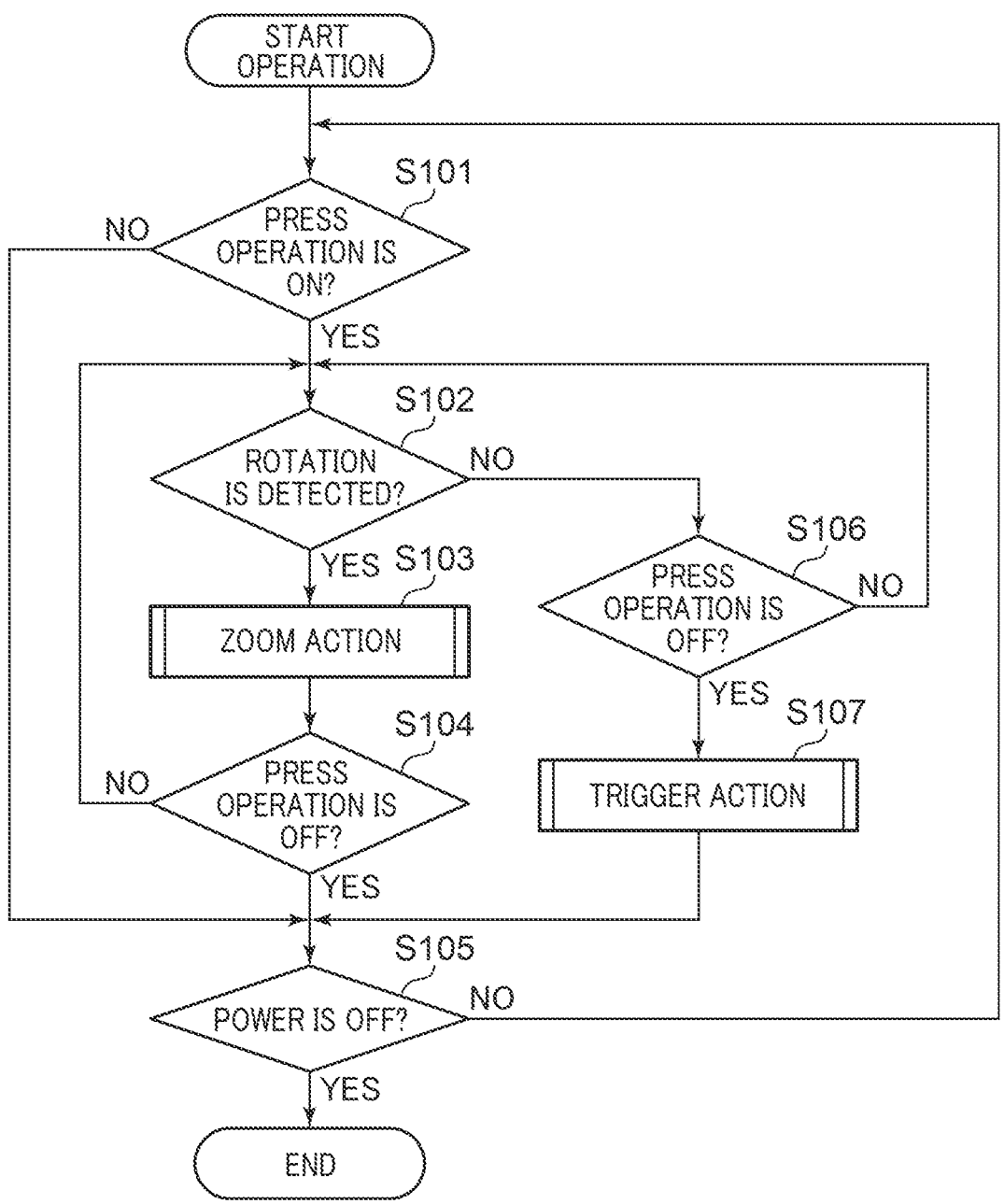
FIG. 15 is a flowchart for describing a process executed when the operation member provided in the gripping device shown in FIG. 1 is operated.

FIG. 15 is a flowchart for describing a process executed when the operation member provided in the gripping device shown in FIG. 1A is operated. It should be noted that each process (step) in the flowchart indicated by an S-number is performed under control of the controller 121 shown in FIG. 1A.

When the power source is turned ON in the camera body 1, the controller 121 determines whether a press operation is ON (detected) on the basis of the detection result of the trigger operation detection unit 214 (S101). When the press operation is ON ("YES" in S101), the controller 121 determines whether a rotation operation (slide operation) is detected on the basis of the detection result of the zoom operation detection unit 253 (S102). When the rotation operation is detected ("YES" in S102), the controller 121 executes a zoom function (S103: zoom action).

After performing the zoom action, the controller 121 determines whether the press operation is OFF (not detected) on the basis of the detection result of the trigger operation detection unit 214 (S104). When the press operation is not OFF ("NO" in S104), the controller 121 returns the process to S102.

In the meantime, when the press operation is OFF ("YES" in S104), the controller 121 determines whether the power source is turned OFF in the camera body 1 (S105). When the power source is not turned OFF ("NO" in S105), the controller 121 returns the process to S101. When the power source is turned OFF ("YES" in S105), the controller 121 finishes the process.

It should be noted that when the press operation is OFF ("NO" in S101), the controller 121 proceeds with the process to S105.

When the rotation operation is not detected ("NO" in S102), the controller 121 determines whether the press operation is OFF on the basis of the detection result of the trigger operation detection unit 214 (S106). When the press operation is not OFF ("NO" in S106), the controller 121 returns the process to S102.

In the meantime, when the press operation is OFF ("YES" in S106), the controller 121 executes a trigger function (S107: trigger action). After performing the trigger action, the controller 121 proceeds with the process to S105.

Figure 16A:
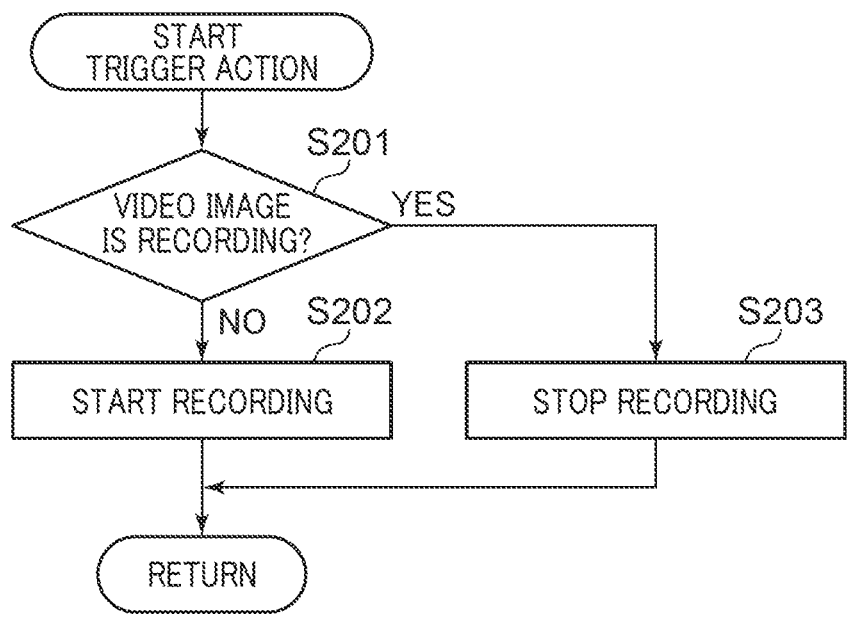
FIG. 16A and FIG. 16B are flowcharts for describing a trigger action and a zoom action shown in FIG. 15.
Figure 16B:
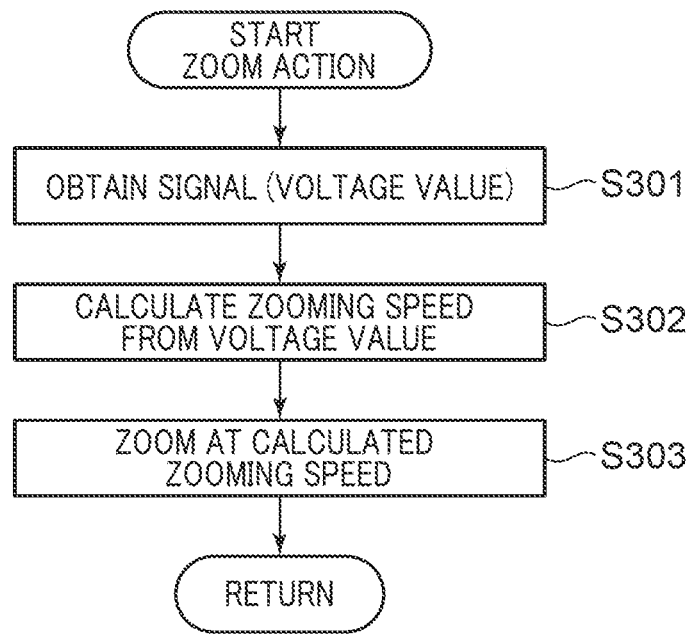

FIG. 16A and FIG. 16B are flowcharts for respectively describing the trigger action and zoom action shown in FIG. 15.

As shown in FIG. 16A, when the trigger action is started, the controller 121 determines whether a video image is recording in the camera (S201). When a video image is not recording ("NO" in S201), the controller 121 starts recording a video image (S202). When a video image is recording ("YES" in S201), the controller 121 stops recording the video image (S203). After the process in S202 or S203, the controller 121 proceeds with the process to S105 in FIG. 15.

As shown in FIG. 16B, when the zoom action is started, the controller 121 obtains the output signal from the zoom operation detection unit 253 (S301). Since the known variable resistance system is used for detecting a zoom operation, the output signal of the zoom operation detection unit 253 is a voltage value.

The controller 121 calculates a zooming speed on the basis of the voltage value (S302). Then, the controller 121 changes a field angle (zooms) at the zooming speed concerned (S303). After that, the controller 121 proceeds with the process to S104 in FIG. 15.

Although the zoom action is performed by what is called optical zoom in this example, electronic zoom may be employed instead of the optical zoom.

Furthermore, although the zoom action is described as an example in FIG. 15, an operation to adjust a continuous setting condition, such as a focus operation, may be subjected. Moreover, although the video image recording is described as the trigger action, switching of recording and reproducing may be subjected to the trigger action, for example.

As mentioned above, the gripping device 2 is configured to allow the press operation of the operation member 21 within the range of approximately 180 degrees in the circumferential direction and to allow the slide operation at a position moved in a radial direction. Accordingly, even when a user changes the height of the camera, the user is able to operate the operation member 21 by gripping again without rotating the gripping device 2 as mention later.

FIG. 17A through FIG. 17F are views for describing an operation of the operation member 21 provided in the gripping device 2 shown in FIG. 1A.

Figure 17A:
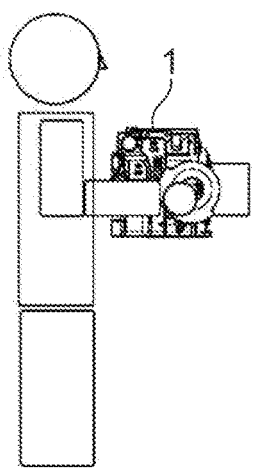
FIG. 17A through FIG. 17F are views for describing operations of the operation member provided in the gripping device shown in FIG. 1.
Figure 17B:
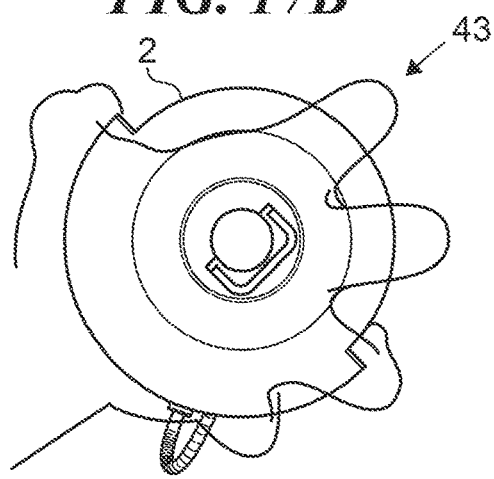

When the user holds the camera at a height of user's breast for shooting as shown in FIG. 17A, the user is able to operate the operation member at a position indicated by a reference numeral 43 by gripping the gripping device 2 as shown in FIG. 17B.

Figure 17C:
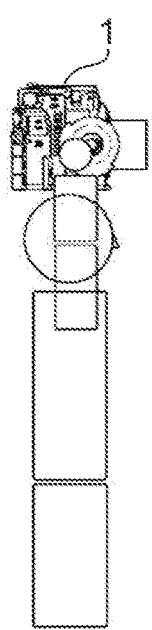
Figure 17D:
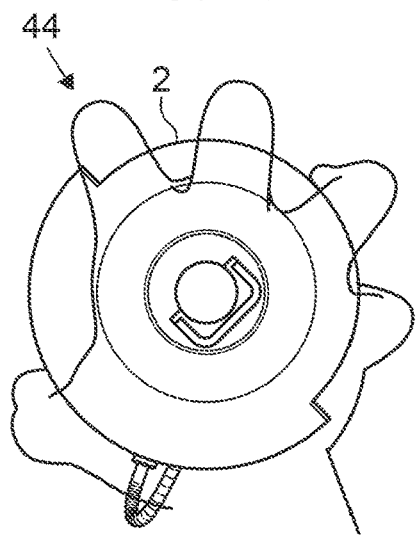

Moreover, when the user holds the camera at an upper position for shooting as shown in FIG. 17C, the user is able to operate the operation member at a position indicated by a reference numeral 44 by gripping the gripping device 2 as shown in FIG. 17D.

Figure 17E:
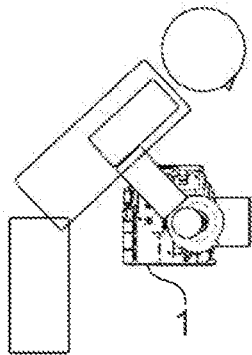
Figure 17F:
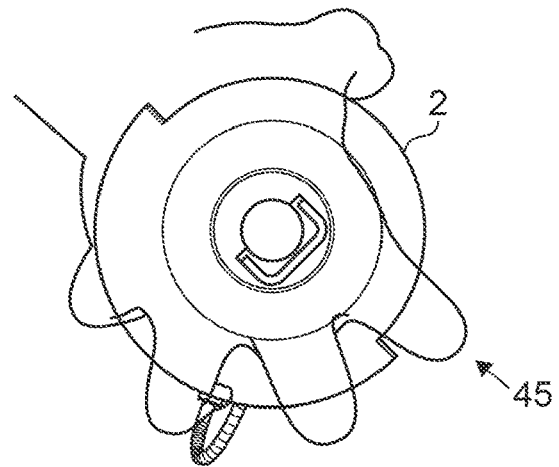

Furthermore, when the user holds the camera at a lower position for low-angle shooting as shown in FIG. 17E, the user is able to operate the operation member at a position indicated by a reference numeral 45 by gripping the gripping device 2 as shown in FIG. 17F.

Figure 18:
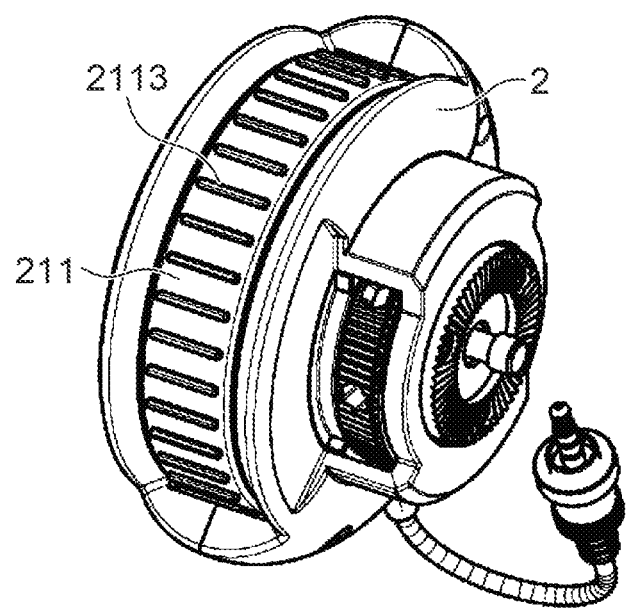
FIG. 18 is a perspective view showing a modified example of the gripping device in the first embodiment of the present invention.

FIG. 18 is a perspective view showing a modified example of the gripping device according to the first embodiment of the present invention.

As shown in FIG. 18, the trigger member 211 has a plurality of convex ribs 2113 that are formed on the circumferential surface that is pressed by a user. As a result of this, when the user operates the operation member 21, the convex ribs 2113 function as slip resistance and the user can perform sliding operation certainly.

In this way, according to the first embodiment of the present invention, even when a user changes the gripping position of an electronic apparatus, such as a camera, the user is able to operate the operation member, such as a switch, suitably.

Subsequently, an example of a gripping device according to a second embodiment of the present invention will be described.

FIG. 19A and FIG. 19B are perspective views for describing the example of the gripping device according to the second embodiment of the present invention. FIG. 19A is a perspective view showing the gripping device. FIG. 19B is an exploded perspective view showing the gripping device. It should be noted that the illustrated gripping device is used by attaching to the camera body 1 described in the first embodiment, for example.

The illustrated gripping device 5 is different in the input method from the gripping device 2 described in the first embodiment. A touch panel 512 is arranged at an operation member 51, and the touch panel 512 is able to detect a contact position in a circumferential direction at least.

As shown in FIG. 19B, the operation member 51, a fixing member 531, and a fixed operating member 532 are arranged so as to be sandwiched between a side face member 541 and side face member 542. The fixing member 531 and fixed operating member 532 are the same as the fixing member 231 and fixed operating member 232 described in the first embodiment.

A communication unit 52 has a communication wire 521 and communication terminal 522, and the communication terminal 522 is connected to the camera body communication unit 17. This enables the camera body 1 to supply electric power to the gripping device 5 and enables communication between the camera body 1 and the gripping device 5. An input operation through the touch panel 512 arranged at the operation member 51 is sent to the communication unit 52 through a touch panel drive IC 513. Then, the communication unit 52 sends an operation signal corresponding to the input operation to the camera body 1. In the camera body 1, the process depending on the operation signal is performed as described using FIG. 15, FIG. 16A, and FIG. 16B.

In this way, in the second embodiment of the present invention, the operation member is provided with the touch panel and a process corresponding to a touch operation on the touch panel is performed. As a result of this, a user is able to operate the operation member, such as a switch, suitably even when the user changes the holding position of the electronic apparatus, such as a camera.

Subsequently, one example of a gripping device according to a third embodiment of the present invention will be described.

FIG. 20A and FIG. 20B are perspective views for describing an example of a gripping device according to a third embodiment of the present invention. FIG. 20A is a perspective view showing the gripping device. FIG. 20B is an exploded perspective view showing the gripping device. It should be noted that the illustrated gripping device is used by attaching to the camera body 1 described in the first embodiment, for example.

The illustrated gripping device 6 has a grip belt unit 66 that assists grip by a user. Moreover, the gripping device 6 is provided with an operation member 61 that has the same function as the operation member 21 described in the first embodiment.

As shown in FIG. 20B, the illustrated gripping device 6 has a fixing screw 631 for fixing to the camera body 1. The fixing screw 631 is provided with a shaft 6311. Then, a hexagon socket 6312 is formed at the front end of the shaft 6311. The operation member 61 has a hole 6531 through which the shaft 6311 is inserted. The grip belt unit 66 is rotatably attached to a hole 6411 formed in a side face member 641.

A mounting member 661 and shaft member 662 that are provided in the grip belt unit 66 are movable within a predetermined range along a rotation axis H. Then, a spring 663 energizes a mounting member (rotation member) 661 in a direction away from the gripping device 6.

Figure 21A:
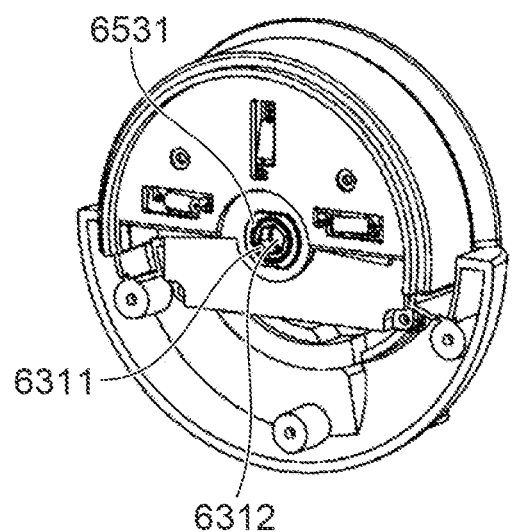
FIG. 21A and FIG. 21B are perspective views for describing an operation member provided in the gripping device shown in FIG. 20A.
Figure 21B:
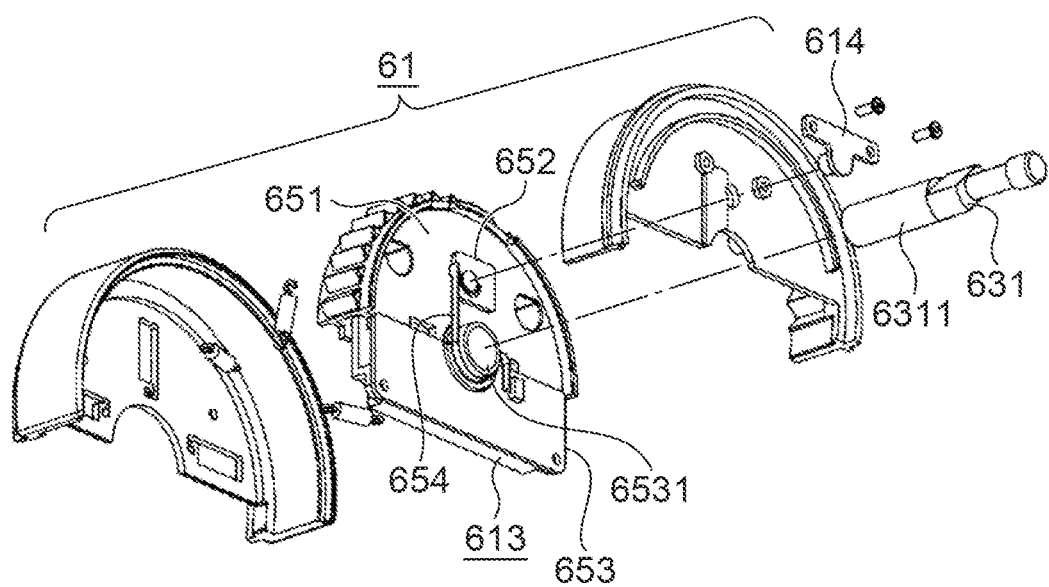

FIG. 21A and FIG. 21B are perspective views for describing the operation member provided in the gripping device shown in FIG. 20A. FIG. 21A is a perspective view showing the gripping device in a state where the grip belt unit and side face member are removed. FIG. 21B is an exploded perspective view showing the operation member.

As shown in FIG. 21A, the shaft 6311 is inserted through the hole 6531, so that the hexagon socket 6312 appears. In FIG. 21B, the fixing screw 631 is shown for convenience of description. Since a mechanism for allowing a press operation and rotation operation in the operation member 61 is the same as that in the first embodiment, the description is omitted.

The hole 6531 through which the shaft 6311 is inserted is formed at a position that coincides with the rotation axis of the zoom operation member 651. A trigger operation detection unit 614 and trigger operation detection board 652 are arranged at a position that avoids the hole 6531. The trigger operation detection board 652 and a zoom operation detection board 653 are connected via a flexible substrate (FPC) 654. Methods of trigger operation detection and zoom operation detection are the same as that in the first embodiment.

Figure 22A:
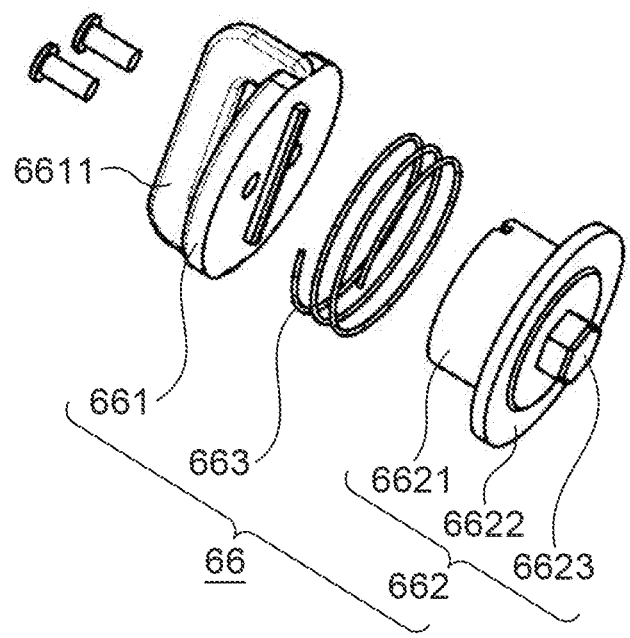
FIG. 22A and FIG. 22B are perspective views for describing a grip belt unit shown in FIG. 20A.
Figure 22B:
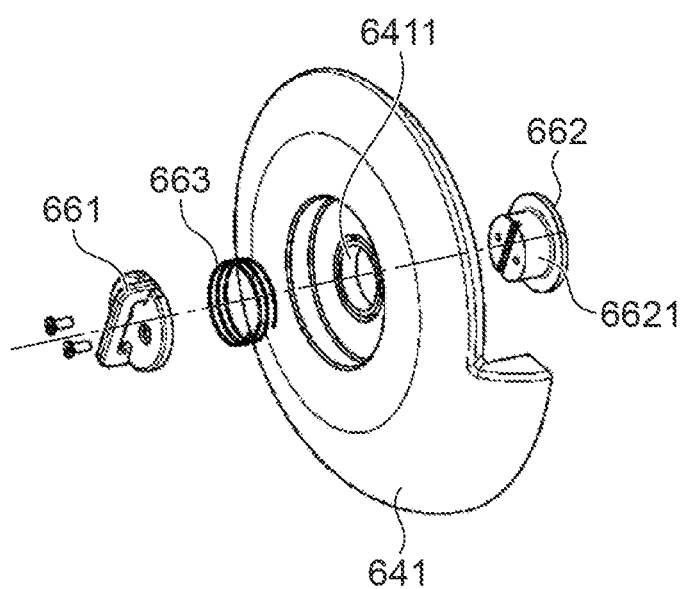

FIG. 22A and FIG. 22B are perspective views for describing the grip belt unit shown in FIG. 20A. FIG. 22A is an exploded perspective view showing the grip belt unit. FIG. 22B is an exploded perspective view showing a fixing method for the grip belt unit.

The grip belt unit 66 has the mounting member 661 equipped with a ring section 6611 to which a grip belt 664 is attached. Furthermore, the grip belt unit 66 has the spring 663 and the shaft member 662 that is provided with a shaft 6621, a flange 6622, and a hexagon convex section 6623.

In the grip belt unit 66, the shaft 6621 is rotatably inserted through the hole 6411 of the side face member 641. Then, the mounting member 661 and the shaft member 662 are fixed so to sandwich the side face member 641 and spring 663.

Figure 23:
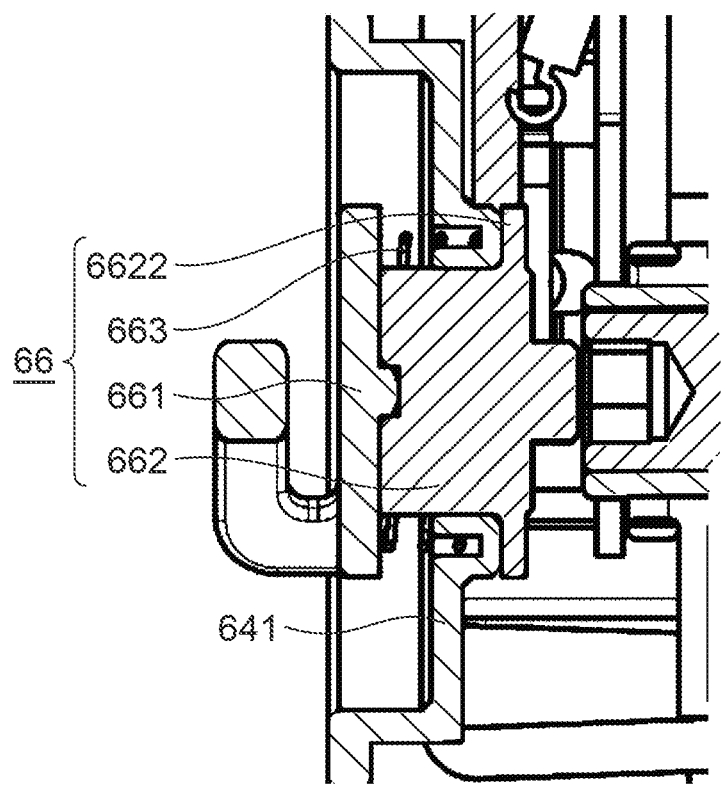
FIG. 23 is a sectional view showing a periphery of the grip belt unit shown in FIG. 20A.

FIG. 23 is a sectional view showing a periphery of the grip belt unit shown in FIG. 20A.

As illustrated, the grip belt unit 66 is energized by the spring 663 in the direction away from the gripping device 6 and is regulated at the position where the flange 6622 contacts the side face member 641.

FIG. 24A and FIG. 24B are sectional views showing the gripping device shown in FIG. 20A. FIG. 24A is a sectional view showing rotation of the grip belt unit. FIG. 24B is a sectional view showing rotation of the fixing screw.

As shown in FIG. 24A, the grip belt unit 66 is energized by the spring 663 in the direction away from the gripping device 6 and is rotatable at arbitrary angles with respect to the gripping device 6.

The grip belt unit 66 is movable along the rotation axis. The hexagon convex section 6623 engages with the hexagon socket 6312 at the position shown in FIG. 24, so that the fixing screw 631 rotates in conjunction with the grip belt unit 66.

Figure 25B:
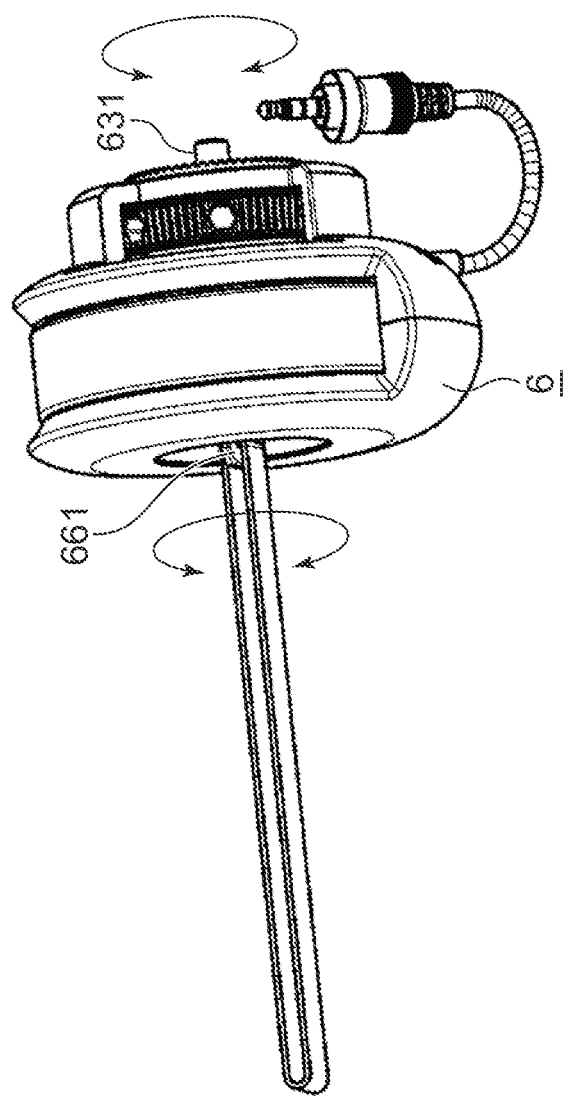
FIG. 25A and FIG. 25B are perspective views for describing an operation of the gripping device shown in FIG. 20A.
Figure 25A:
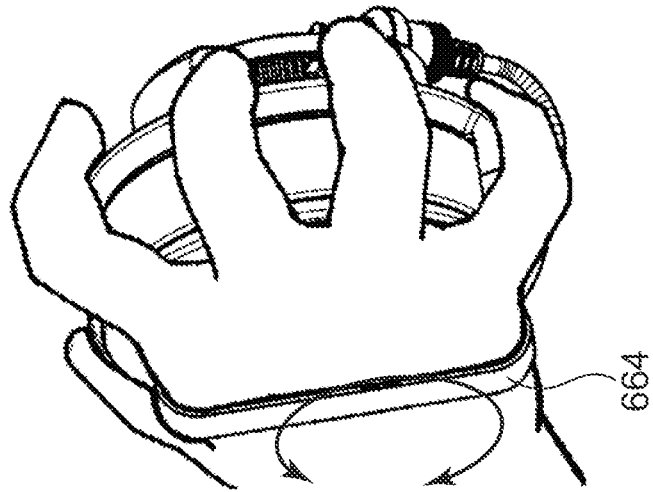

FIG. 25A and FIG. 25B are perspective views for describing an operation of the gripping device shown in FIG. 20A. FIG. 25A is a perspective view showing a gripping style of the gripping device. FIG. 25B is a perspective view showing detachment of the gripping device.

As shown in FIG. 25A, a user is able to grip the gripping device 6 by rotating the grip belt 664 at an arbitrary angle. As shown in FIG. 25B, the user is able to detach the gripping device 6 from the camera body 1 by rotating the grip belt unit 66 while pushing the grip belt unit 66 into the gripping device 6 so as to rotate the fixing screw 631 in conjunction with the grip belt unit 66.

In this way, according to the third embodiment of the present invention, even when a user changes the gripping position of an electronic apparatus, such as a camera, the user is able to operate the operation member, such as a switch, suitably. Furthermore, the user is able to attach the gripping device to the camera body and detach the gripping device from the camera body easily using the grip belt unit.

Although the preferable embodiments of the present invention have been described above, the present invention is not limited to these embodiments, and various deformations and variations are available within the scope of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-187539, filed Oct. 2, 2018, which is hereby incorporated by reference herein in its entirety.

What is claimed is:

1. A gripping device attachable to an electronic apparatus that includes an image pickup unit, and is used for gripping the electronic apparatus, the gripping device comprising:
   a gripping member including a side surface that is approximately circular; and
   an operation member that:
      includes an operation panel arranged along a circumference of the gripping member and that is operated for causing a predetermined action of the electronic apparatus; and
      allows at least a first operation that presses the operation panel in a radial direction of the gripping member and a second operation that slides the operation panel in a circumferential direction of the gripping member, the first operation causing the image pickup unit to start image shooting.

2. The gripping device according to claim 1, wherein the operation panel is positioned inside outer peripheral edges of the gripping member.

3. The gripping device according to claim 1, wherein the operation member comprises a first operation member that is rotatable around a rotation axis and a second operation member that is rotatable around the rotation axis in conjunction with the first operation member.

4. The gripping device according to claim 1, wherein the operation panel is provided with a touch panel.

5. The gripping device according to claim 1, further comprising a fixing member that detachably holds the gripping device to the electronic apparatus.

6. The gripping device according to claim 1, further comprising a grip belt unit that is attached to the gripping member.

7. The gripping device according to claim 6, further comprising:
   a fixing member that detachably holds the gripping device to the electronic apparatus,
   wherein the grip belt unit is rotatable around a rotation axis, is movable between a first position and a second position in a direction of the rotation axis, and is energized in a direction from the first position to the second position, and
   wherein the grip belt unit engages with the fixing member at the first position and releases engagement with the fixing member at the second position.

8. The gripping device according to claim 7, wherein the grip belt unit comprises a flexible grip belt.

9. An electronic apparatus including an image pickup unit, the electronic apparatus comprising:
   a controller; and
   a gripping device attached to the electronic apparatus and is used for gripping the electronic apparatus, and comprising:
      a gripping member including a side surface that is approximately circular; and
      an operation member that;
         includes an operation panel arranged along a circumference of the gripping member and that is operated for causing a predetermined action of the electronic apparatus and
         allows at least a first operation that presses the operation panel in a radial direction of the gripping member and a second operation that slides the operation panel in a circumferential direction of the gripping member from a position moved by the first operation,
   wherein the controller controls the image pickup unit to start image shooting according to the first operation.

10. The electronic apparatus according to claim 9, wherein the an image pickup unit outputs an image signal according to an optical image formed through an image pickup optical system.

11. The electronic apparatus according to claim 9, wherein the operation member comprises a first operation member that is rotatable around a rotation axis and a second operation member that is rotatable around the rotation axis in conjunction with the first operation member.

12. The electronic apparatus according to claim 9, wherein the controller controls the electronic apparatus to perform the predetermined action in a case where the second operation is performed after the first operation is performed.

13. The electronic apparatus according to claim 12, wherein the predetermined action includes one of a zooming action or a focusing action of the image pickup optical system.

14. The electronic apparatus according to claim 10, wherein the gripping device is arranged in a direction that intersects an optical axis of the image pickup optical system.

15. The electronic apparatus according to claim 11, wherein the controller controls the electronic apparatus to further perform:
   the image shooting in a case where the second operation member is returned to a predetermined neutral holding position after sliding the second operation member by a predetermined amount; and a predetermined action in a case where the first operation member and the second operation member are rotated after sliding the second operation member by the predetermined amount.

* * * * *